(12) United States Patent
Roberts et al.

(10) Patent No.: US 9,729,247 B2
(45) Date of Patent: *Aug. 8, 2017

(54) METHODS AND APPARATUS FOR MULTIPHASE SAMPLING OF MODULATED LIGHT

(71) Applicant: Intel Corporation, Santa Clara, CA (US)

(72) Inventors: Richard D. Roberts, Hillsboro, OR (US); Mathys C. Walma, Hillsboro, OR (US); Praveen Gopalakrishnan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/924,434

(22) Filed: Oct. 27, 2015

(65) Prior Publication Data

US 2016/0050022 A1     Feb. 18, 2016

Related U.S. Application Data

(63) Continuation of application No. 13/630,066, filed on Sep. 28, 2012, now Pat. No. 9,203,541.

(51) Int. Cl.
*H04B 10/04*     (2006.01)
*H04B 10/564*     (2013.01)
(Continued)

(52) U.S. Cl.
CPC ......... *H04B 10/564* (2013.01); *H04B 10/116* (2013.01); *H04B 10/60* (2013.01); *H04B 10/616* (2013.01); *H04J 14/00* (2013.01)

(58) Field of Classification Search
CPC .... H04B 10/564; H04B 10/116; H04B 10/60; H04B 10/616; H04B 10/1149; H04B 10/50; H04B 10/504; H04B 10/505; H04B 10/5051; H04B 10/5053; H04B 10/5055; H04B 10/506; H04B 10/516; H04J 14/00; H04J 3/22
(Continued)

(56) References Cited

U.S. PATENT DOCUMENTS 8,306,431 B2 * 11/2012 Takahara ........... H04B 10/5053
                                                                       398/152
8,488,978 B2 * 7/2013 Watanabe ............. G02F 1/3515
                                                                     359/326

(Continued)

*Primary Examiner* — M. R. Sedighian
(74) *Attorney, Agent, or Firm* — Schwabe, Williamson & Wyatt, P.C.

(57) ABSTRACT

A light transmitter to transmit multiple light packets, each formatted to include a same message comprising a series of bits, each bit represented as light that is intensity modulated over a bit period at a frequency indicative of the bit. The light packets are transmitted at different start-times to establish different phases, one for each of the light packets, to permit a light receiver to sample each message at a different phase of a fixed sample timeline that is asynchronous to the bit period and the frequency. The light receiver samples the multiple light packets based on the sample timeline, to sample each received message at one of the different sample phases, then constructs a best series of bits based on the multiple demodulated messages.

18 Claims, 16 Drawing Sheets

(51) Int. Cl.
*H04B 10/61* (2013.01)
*H04B 10/60* (2013.01)
*H04J 14/00* (2006.01)
*H04B 10/116* (2013.01)

(58) Field of Classification Search
USPC .................................................. 398/182–198
See application file for complete search history.

(56) References Cited

U.S. PATENT DOCUMENTS

| | | | | |
|---|---|---|---|---|
| 9,178,615 | B2* | 11/2015 | Roberts | H04B 10/116 |
| 2003/0058504 | A1* | 3/2003 | Cho | H04L 7/0075 |
| | | | | 398/147 |
| 2008/0285977 | A1* | 11/2008 | Caplan | H04B 10/504 |
| | | | | 398/130 |
| 2012/0063788 | A1* | 3/2012 | Caplan | H04B 10/564 |
| | | | | 398/182 |
| 2014/0003823 | A1* | 1/2014 | Roberts | H04B 10/116 |
| | | | | 398/187 |

* cited by examiner

Multiphase Transmission
& Reception Example
1000

Transmit Packet $P_{sent}$ 3 times:

$P_{sent}$=[0 1 1 1 0 0 1 0 0 1]

Receive, Demodulate 3 Packets (w/ errors):
  P1=[0 1 1 1 1 0 1 0 0 1] Sample phase 1
  P2=[1 1 1 1 0 0 1 0 0 1] Sample phase 2
  P3=[0 1 1 1 0 0 1 1 0 1] Sample phase 3

Reconstruct $P_{sent}$ (Best Packet), based on Majority Bit Voting across P1, P2, P3:

$P_{fec}$=[0 1 1 1 0 0 1 0 0 1]

```
┌─────────────────────────────────────────────────┐
│ Transmitting multiple light packets each formatted to │
│ include a same message comprising a series of bits,  │──── 1305
│ each bit represented as light that is intensity modulated │
│ over a bit period at a frequency indicative of the bit │
└─────────────────────────────────────────────────┘
                        ▼
┌─────────────────────────────────────────────────┐
│ Varying transmit start-times of the multiple messages │
│ relative to each other to permit a light receiver to │
│ sample each message at a different phase of a fixed │──── 1310
│ sample timeline of the light receiver that is │
│ asynchronous to the bit period and the frequency │
└─────────────────────────────────────────────────┘
                        ▼
┌─────────────────────────────────────────────────┐
│ Receiving the multiple transmitted light packets │──── 1315
└─────────────────────────────────────────────────┘
                        ▼
┌─────────────────────────────────────────────────┐
│ Sampling the received multiple light packets based on │
│ the asynchronous fixed sample timeline, to produce │──── 1320
│ samples for each received message that coincide in time │
│ with a corresponding one of the different phases │
└─────────────────────────────────────────────────┘
                        ▼
┌─────────────────────────────────────────────────┐
│ Demodulating each of the sampled messages, to │──── 1325
│ produce multiple demodulated messages │
└─────────────────────────────────────────────────┘
                        ▼
┌─────────────────────────────────────────────────┐
│ Constructing a series of data bits representative of the │
│ same message based on the multiple demodulated │──── 1330
│ messages │
└─────────────────────────────────────────────────┘
```

FIG. 13

METHODS AND APPARATUS FOR MULTIPHASE SAMPLING OF MODULATED LIGHT

CROSS REFERENCE TO RELATED APPLICATIONS

This application is a continuation of U.S. Utility patent application Ser. No. 13/630,066, Sep. 28, 2012, which is incorporated herein by reference in its entirety.

BACKGROUND

A light communication system may include a light transmitter to transmit data bits in modulated light packets to a light receiver, such as a camera. The light packets modulated to convey the data bits at a transmit bit rate. A logic level of each transmitted data bit may be represented as light that is intensity modulated to indicate the logic level. The camera samples the received light packets once every camera frame at a frame rate of the camera, to produce light samples at the frame rate. The data bits may then be demodulated based on the light samples.

Ideally, the transmit bit rate and the camera frame rate (or sample rate) are synchronized so as to produce consistent, error free samples that result in correctly demodulated bits in the receiver. In practice, however, the transmit bit rate and the camera frame rate are not often synchronized because the transmitter and the receiver operate based on their respective different clocks that are not synchronous with each other, i.e., their clocks are asynchronous. When the transmit bit rate and the frame rate are not synchronized, then the transmitted data bits slowly "slip" through or "drift" by the camera frames or sample times. Due to this drift, occasionally camera sample times will coincide with and thereby sample edge transitions in the intensity modulated light, which results in an indeterminate sample, i.e., a sample that has an indeterminate level. Disadvantageously, this may result in an erroneous demodulated data bit.

BRIEF DESCRIPTION OF THE DRAWINGS

For illustrative purposes, one or more features disclosed herein may be presented and/or described by way of example and/or with reference to one or more drawing figured listed below. Methods and systems disclosed herein are not, however, limited to such examples or illustrations.

FIG. 10 is a diagram of an example of multiphase transmission and reception, in which a light transmitter transmits three multiphase light packets each carrying the same 10-bit data message, with multiphase offsets.

FIG. 13 is a flowchart of an example method summarizing multiphase transmission embodiments.

Figure 1A:
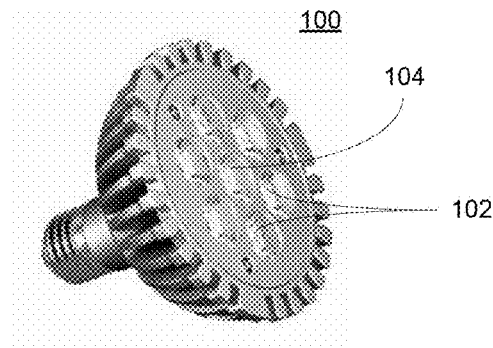
FIG. 1A is an illustration of an example light array, which may operate in accordance with embodiments described herein.

In the drawings, the leftmost digit(s) of a reference number identifies the drawing in which the reference number first appears.

DETAILED DESCRIPTION

Described below are embodiments directed to multiphase sampling of light packets to reduce deleterious effects otherwise caused when a light transmitter and a light receiver are not synchronized. Multiphase sampling can be used with an arbitrary light transmitter that transmits light to the light receiver, such as a camera. Each transmitted light packet may be formatted to include sequential fields of modulated light, including an efficient start-frame-delimiter (SFD), followed by a data message, comprising a series of data bit values to be transmitted at a transmit bit rate, e.g., at 15 bits-per-second (bps). The light corresponding to the data message may be modulated in accordance with a modulation technique referred to as frequency shift on-off keying (FSOOK). In FSOOK, each bit level may be represented as light that is intensity modulated (e.g., cyclically keyed between HIGH and LOW intensity levels) over a bit period, at one of multiple frequency shift keying (FSK) frequencies, each indicative of one of multiple bit levels (i.e., logic 0 and logic 1). In other words, each bit level is represented as a corresponding FSK waveform of intensity modulated light.

The light receiver receives the transmitted light packets and samples the FSK waveform at a receive sample rate or frame rate, e.g., 30 frames-per-second (fps), to produce light samples at that rate. The light receiver demodulates the data bits of the received light packets based on the light samples. Demodulation is facilitated by maintaining, as near as possible, a harmonic relationship between the transmit bit rate and the receive sample rate. As mentioned above, multi-phase sampling compensates for a lack of synchronization between the receive sample rate and the transmit bit rate (and the FSOOK frequencies associated with the bit levels), i.e., when a strict harmonic relationship between the two rates is not maintained.

I. LIGHT ARRAYS

FIG. 1A is an illustration of an example light array 100, which may operate according to embodiments described herein. Light array 100 includes LEDs 102 that are spatially-separated from each other in 2-dimensions, but clustered closely together around a center LED 104.

Figure 1B:
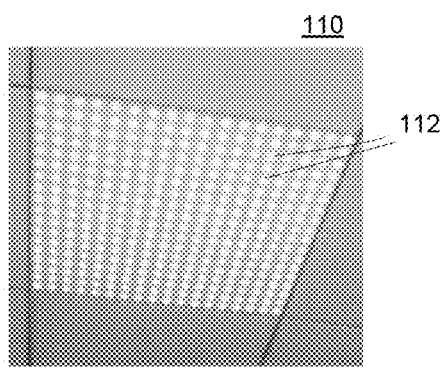
FIG. 1B is an illustration of another example light array, which may operate in accordance with the embodiments described herein.

FIG. 1B is an illustration of an example light array 110, which may operate according to embodiments described herein. Array 110 includes a rectangular array of LEDs 112 that are spatially-separated so as to be relatively far apart from each other compared to lights 102 of array 100.

Figure 1C:
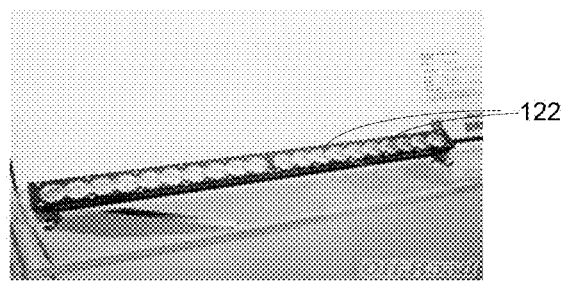
FIG. 1C is an illustration of yet another example light array, which may operate in accordance with the embodiments described herein.

FIG. 1C is an illustration of an example light array 120, which may operate according to embodiments described herein. Array 110 includes a linear array, or line bar, of LEDs 122.

Figure 2:
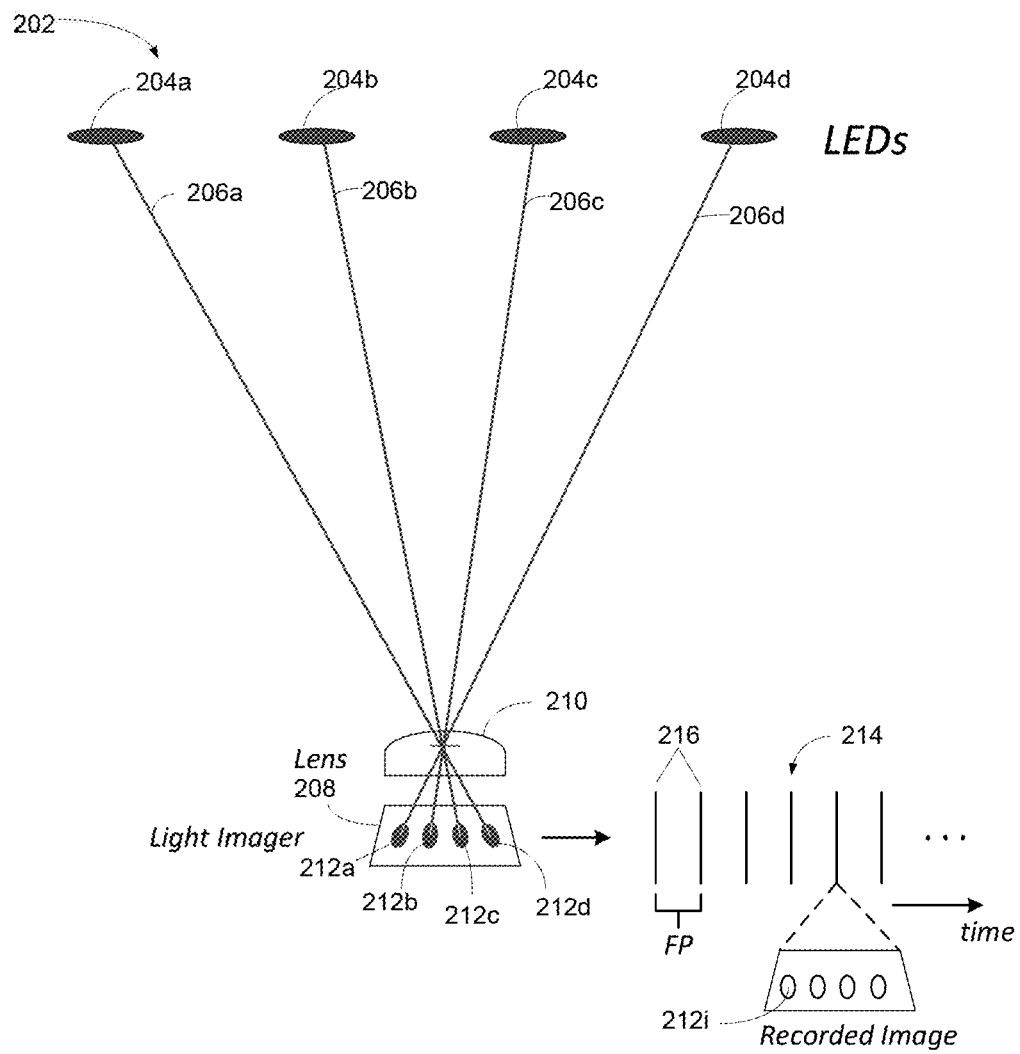
FIG. 2 is a diagram of an example light communication system employing spatially-separated beams.

FIG. 2 is a diagram of an example light array 202 that may operate in accordance with embodiments described herein. FIG. 2 introduces concepts helpful to understanding the embodiments described later. Light array 202 may be configured similarly to any of light arrays 100, 110, and 120, or any other light array including spatially-separated lights. Array 202 includes lights 204a-204d implemented to transmit simultaneously a respective one of free-space optical light beams 206a-206d to a multi-dimensional or planar light imager/sensor 208, through an imaging lens 210. The terms "light beam" and "light" are use equivalently and interchangeably throughout the ensuing description.

Light imager 208 may include a multi-dimensional charge coupled device (CCD) array including many sensor pixels or light detectors, as is known in the art. Light beams 206a-206d are sufficiently spatially-separated from one another as to form corresponding beam images 212a-212d, or light spots, on spatially-separated areas of light imager 208. Each of light spots/areas 212i occupies a position, e.g., an x-y position on a light sensor plane of the light imager, corresponding to a cluster of sensor pixels. Over time, light imager 208 repetitively captures or records, simultaneous light beams 206i impinging on areas 212i, to produce a time-ordered sequence 214 of recorded images 216 of light array 202.

Light imager 208 captures the images at a predetermined frame rate of, e.g., approximately 30 frames/second, i.e., every 1/30 seconds. Therefore, sequential images 216 are spaced in time by a frame period equal to an inverse of the frame rate. Sequential images 216 may be processed in accordance with methods described herein.

II. LIGHT COMMUNICATION SYSTEM USING FSOOK

Figure 3A:
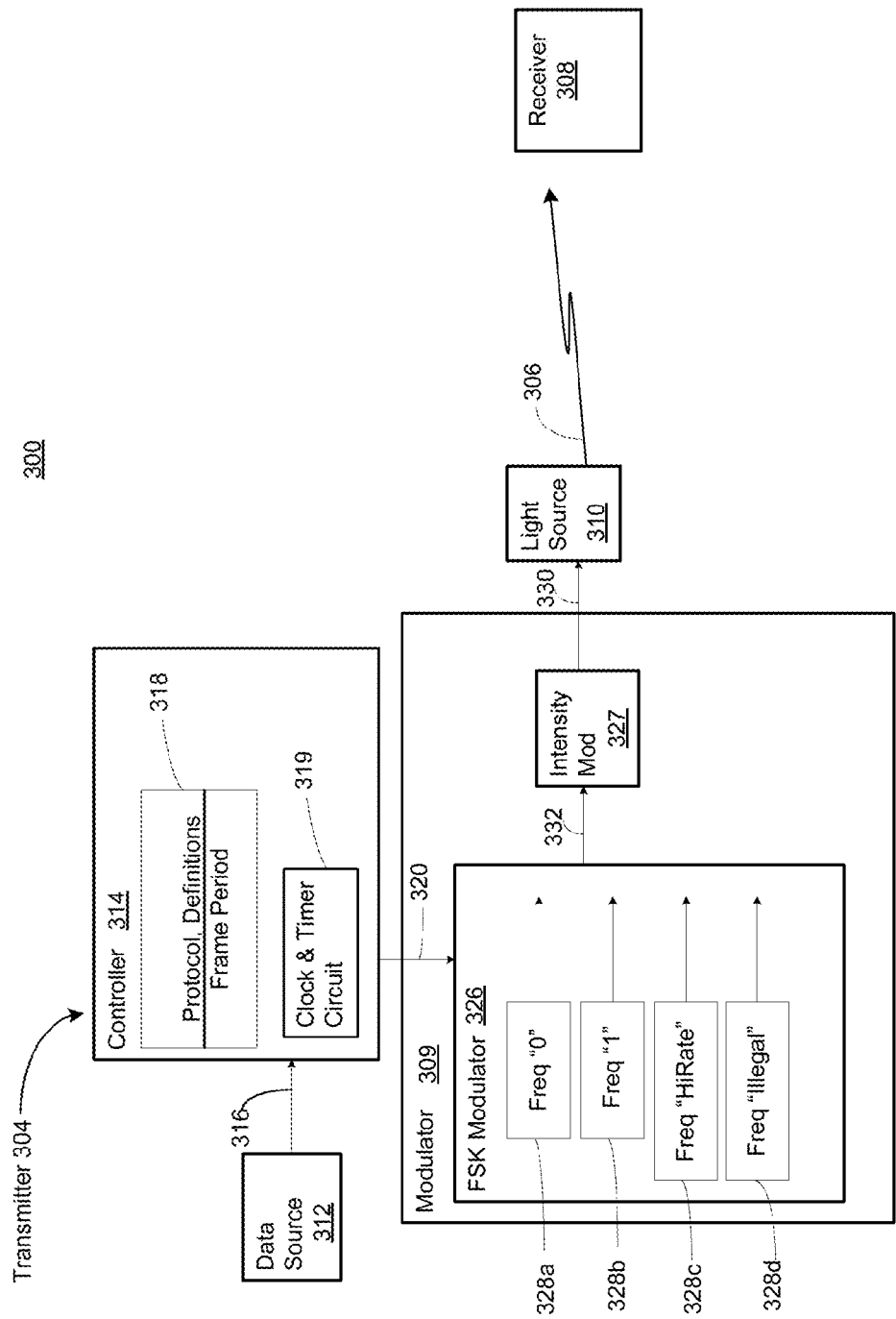
FIG. 3A is a block diagram of an example light communication system and an example light transmitter useful to introduce the principles of frequency shift on-off keying (FSOOK) modulation and detection/demodulation, as it applies to the embodiments described herein.

FIG. 3A is a block diagram of an example light communication system 300 useful to introduce the principles of FSOOK modulation and detection/demodulation. System 300 includes a light transmitter 304 to transmit a FSOOK modulated light beam 306 comprising modulated light packets to a light receiver 308, which detects and demodulates the received light. The FSOOK modulated light beam conveys modulated light packets formatted according to protocol light packet definitions.

A. Light Transmitter

Light transmitter 304 includes a light modulator 309 to intensity modulate a light source 310, a data source 312, and a controller 314 to control the transmitter. Data source 312 provides data 316, such as a message in the form of data bits, to controller 314. Controller 314 includes a memory 318 to store protocol control logic, protocol light packet definitions, and a frame rate Ffps in frames per second, which is equal to the inverse of a frame period Tframe in seconds (i.e., Ffps=1/Tframe). The frame rate Ffps is an anticipated rate at which light receiver 308 will sample received light, as will be described more fully below in connection with FIG. 3B.

Controller 314 also includes a clock and timer module 319 to generate a master timing signal, and derive from the master timing signal timing outputs used by controller 314 to control transmit light packet start times and durations based on the master timing signal. Based on data 316, the contents of memory 318, and the timing outputs from clock and timer module 319, controller 314 generates commands 320 to cause modulator 309 to modulate light source 310 in accordance with examples described herein.

Modulator 309 includes an FSK modulator 326 and an intensity modulator 327 that together generate a modulation signal 330 to FSOOK modulate light source 310. Controller commands 320 include commands that specify (i) a selected frequency at which FSK modulator is to operate, (ii) a start time at which FSK modulator 326 is to begin generating and outputting the selected frequency, and (iii) a duration (or time period) over which the selected frequency is to be generated. The start time and duration may be graduated in fractions of time period Tframe, such as 1/1000 of Tframe. In response to controller commands 320, FSK modulator 326 outputs the selected frequency as an FSK signal 332 beginning at the specified time and duration, such as for an integer number of frame periods, which facilitates detection and demodulation of the frequency at receiver 308.

The selected frequencies may include:
a first frequency 328a F0 (e.g., 120 Hz) indicative of a logic 0 of a data bit 316 to be transmitted;
a second frequency 328b F1 (e.g., 105 Hz) indicative of a logic 1 of the data bit to be transmitted;
a third frequency 328c "HiRate" indicative of a first start-frame-delimiter to be transmitted. The HiRate frequency is orders of magnitude greater than frequencies F0, F1, e.g., many KHz or above. An exemplary HiRate frequency is 25 KHz; and
a fourth frequency 328d "Illegal" (e.g., 112.5 Hz, i.e., half-way between frequencies F0, F1) indicative of a second start frame delimiter to be transmitted.

FSK modulator 326 may include a voltage, or digitally, controlled oscillator that generates the above frequency responsive to commands 320. The terms "tone" or "tones" and "frequency" or "frequencies" are used equivalently and interchangeably herein.

FSK modulator 326 may generate each of the frequencies F0, F1, HiRate, and Illegal of FSK signal 332 as a substantially rectangular, or ON-OFF keying, waveform, where ON represents a logic 1 of the FSK waveform, and OFF represents a logic 0 of the FSK waveform. Also, to transmit a data bit, each of frequencies F0 and F1 may extend over multiple frame periods, and may be harmonically related to the frame period such that an integer number, k, of ½ cycles or periods of the rectangular FSK waveform matches the frame period, as is depicted in FIG. 4A (described below).

More generally:
representing a logic 0, frequency F0=N×Ffps; and
representing a logic 1, frequency F1=N±0.5 Ffps, where N is an integer.

Each of the frequencies F0, F1, HiRate, and Illegal, together with the respective number of frames over which they are transmitted, form a light protocol. More specifically, transmitter 304 combines these parameters into the above mentioned modulated light packets formatted in accordance with the light protocol, and then transmits the light packets.

Figure 4A:
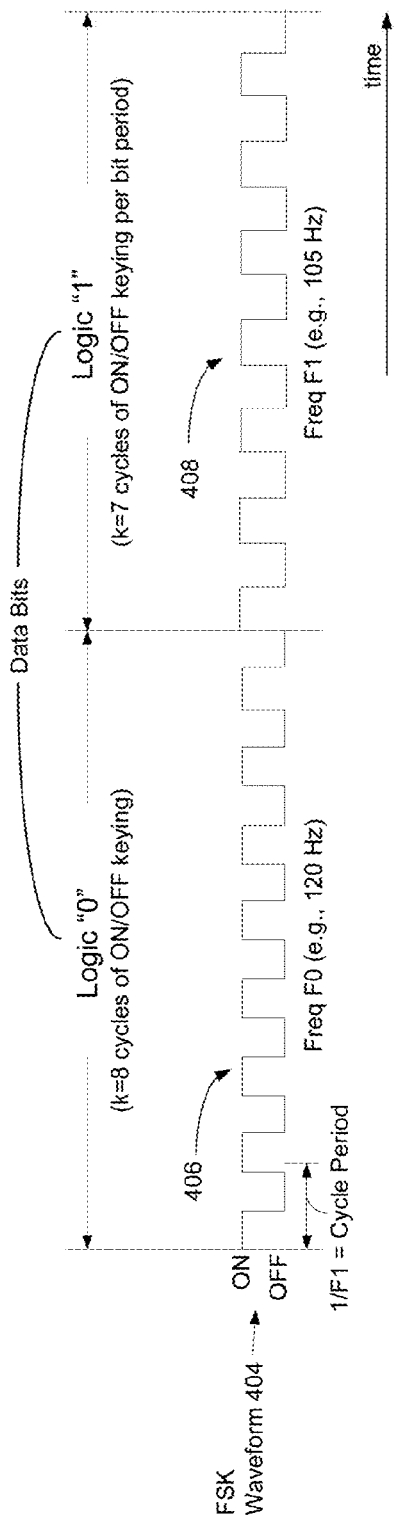
FIG. 4A is an illustration of an example timing diagram of a frequency shift keying (FSK) waveform corresponding to an FSK signal from FIG. 3A.

FIG. 4A is an illustration of an example timing diagram of an FSK waveform 404 corresponding to FSK signal 332 in FIG. 3A, where the frame rate Ffps is 30 Hz, the bit rate is half the frame rate, i.e., the bit rate is ½ Ffps=15 bits-per-second, and N=4. Therefore, each data bit has a duration that is two frames periods, i.e., 2× Tframe.

Therefore, to transmit two consecutive data bits, e.g., a logic 0 followed by a logic 1, controller commands 320 cause FSK modulator 326 to generate first an ON-OFF keying waveform 406 at frequency F0 (e.g., 120 Hz=4×30 Hz) for a time period of two frames to represent the logic 0 data bit, and then an ON-OFF keying waveform 408 at frequency F1 (e.g., 105 Hz=3.5×30 Hz) for a period of two frames to represent the logic 1 data bit.

The harmonic relationship between frequencies F0 and F1 and the period of two frames is such that (i) waveform 406 at frequency F0 includes eight full cycles, i.e., k=8, during the data bit period, and (ii) waveform 408 at frequency F1 includes seven full cycles or periods, i.e., k=7, during the second data bit period. In other words, over a bit period, eight cycles of FSK signal 332 represent a logic 0, while seven cycles represent a logic 1.

Intensity modulator 327 intensity modulates light source 310 based on the modulation signal 330, to produce modulated light beam 306. Light source 310 may be an LED that emits light in any of the visible, infrared, or ultraviolet light spectrums. In an embodiment, modulation signal 330 follows the shape of FSK signal 332 and adjusts a current through light source 310 to proportionally adjust an intensity of light 306 emitted by the light source. In this manner, ON-OFF keying of modulation signal 330 causes corresponding ON-OFF keying of the intensity of light 306, such that the intensity closely follows ON-OFF keying waveforms 404, 406 depicted in FIG. 4A.

Other intensity modulation embodiments are possible, e.g., light source 310 may not be turned off completely during the OFF cycle of the FSK waveform, and so on. For example, a reduced light intensity (e.g., ½ of maximum intensity) from light source 310 may serve as an alternative for the HiRate frequency. Applying a reduced steady state drive current to the light source 310 will cause the light intensity emitted by the light to be correspondingly reduced. Because other such intensity levels are possible, e.g., light source 310 may not be turned off completely, the intensity levels ON, OFF are more generally represented as intensity levels HIGH, LOW.

Transmitter 304 is depicted with one light 310 for simplicity only. Other embodiments include many lights each driven by a corresponding light modulator, as will be described later in connection with FIG. 6.

1. Light Packet

Figure 4B:
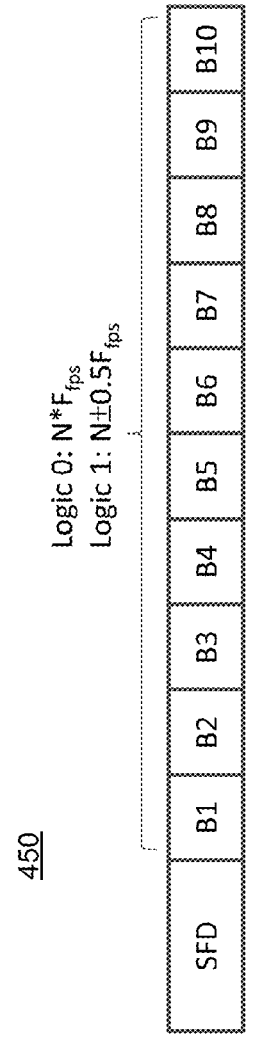
FIG. 4B is an illustration of an exemplary light packet definition or light packet protocol for light packets formatted and transmitted by the light transmitter of FIG. 3A.

FIG. 4B is an illustration of an exemplary light packet definition 450 or light packet protocol for light packets formatted and transmitted by light transmitter 304. According to light packet definition 450, each light packet includes sequential fields of light, beginning with the SFD, which includes light that is intensity modulated at one of the HiRate and Illegal frequencies for multiple, e.g., four, frame periods. Following the SFD, the light packet conveys a series of consecutive, contiguous message bits B1-B10, each of which may be either a logic 0 or a logic 1. Message bits B1-B10 are each conveyed as light that is intensity modulated at the corresponding FSK frequency F0 (for logic 0) or F1 (for logic 1) for two frame periods, i.e., light that is cyclically keyed to multiple intensity levels (e.g., ON, OFF, or HIGH, LOW) at the FSK frequency indicative of the appropriate bit level (i.e., logic 0 or logic 1).

B. Light Receiver

Figure 3B:
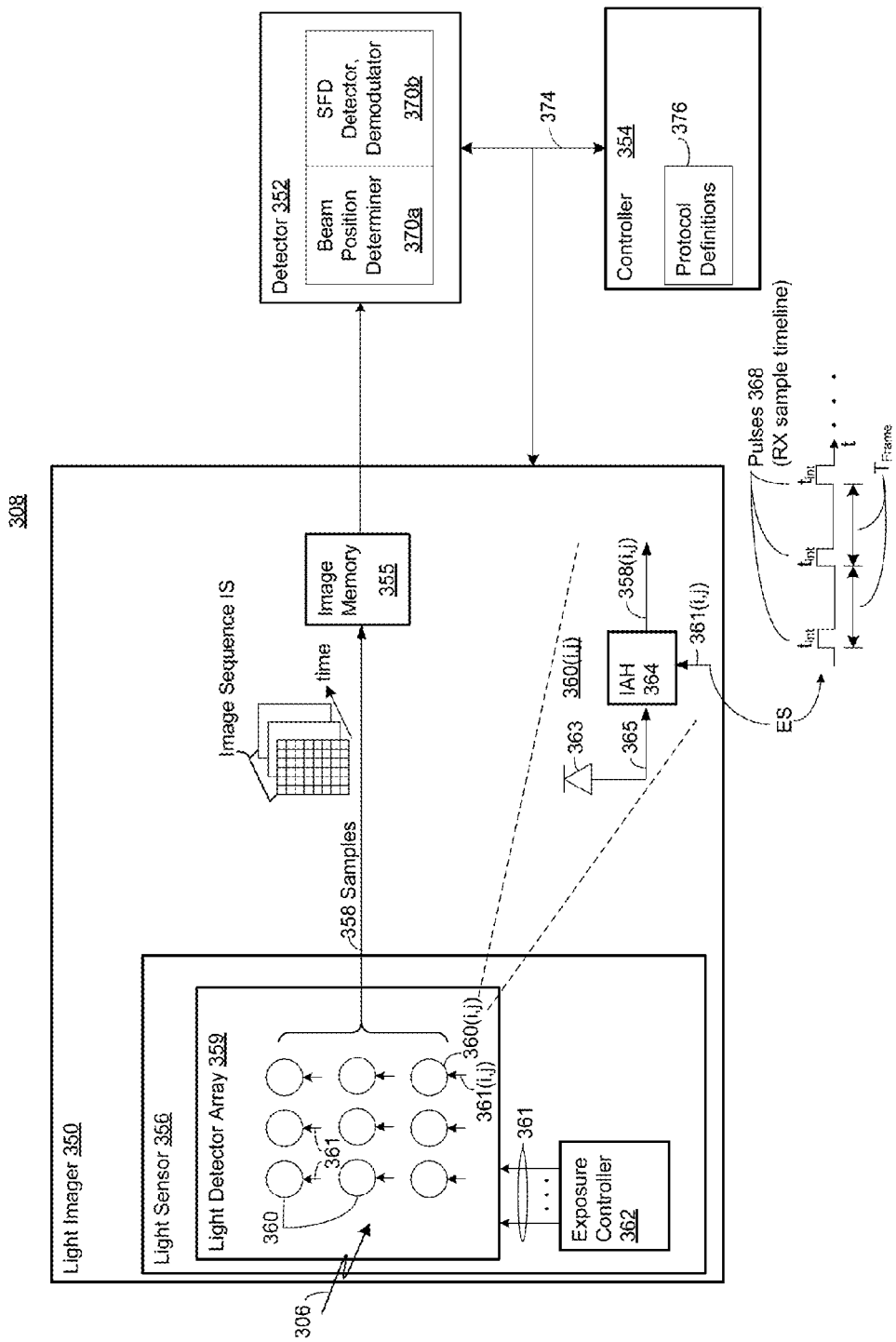
FIG. 3B is a block diagram of a light receiver from FIG. 3A, according to an embodiment.

FIG. 3B is a block diagram of light receiver 308, according to an embodiment. Light receiver 308 receives the modulated light packets conveyed in modulated light 306 beam. In embodiments, light receiver 308 will receive many spatially-separated modulated light beams simultaneously. Light receiver 308 includes a light imager 350 (also referred to as an imager 350) to sample and record received modulated light packets in light beam 306 as images, a detector 352 to detect and demodulate the fields of modulated light in the light packets recorded in the images, and a controller 354 to control the receiver and process the recorded images as described in one or more examples herein.

Imager 350 includes a light sensor 356, e.g., including a 2-dimensional array of light detectors, that repetitively samples light impinging on the light sensor at a predetermined receive sample rate equal to the frame rate, Ffps=1/Tframe, of imager 350 to produce a signal 358. Signal 358 includes a time-ordered sequence of 1-dimensional, or alternatively, 2-dimensional light samples, which form images of an image sequence IS (similar to images 216 depicted in FIG. 2). In other words, the images are formed from the light samples. Accordingly, signal 358 is referred to in terms of both "light samples 358" and "images 358" interchangeable and equivalently. Imager 350 records images 358 in an image memory 355 of the imager.

1. Light Detector Array

Light sensor 356 may include a 2-dimensional light detector array 359, such as a CCD array, including multiple individual light detectors 360 (also referred to as sensor pixels 360) spatially arranged in M rows by N columns, where M and N may each be in the hundreds or thousands. For convenience, exemplary light detector array 359 is depicted in FIG. 3B as having only 3 rows by 3 columns of light detectors 360. Each of light detectors 360 receives a corresponding one of multiple enable signals 361 generated by an exposure controller 362 of light sensor 356. Enable signals 361 cause light detectors 360 to sample light in a controlled manner, to produce light samples 358 (forming the images), which may be digitized light samples, as will be described more fully below.

An exemplary individual light detector 360(i, j) is depicted in expanded view in FIG. 3B at the bottom righthand side of the imager block 350. Descriptors (i, j) indicate the row (i) and column (j) positions in array 359, where i=1 . . . M, j=1 . . . N. Light detector 360(i, j) includes a photo-detector 363 followed by an integrate-and-hold (IAH) circuit 364. Photo-detector 363 converts light energy 306 impinging thereon into an electrical signal 365 having a magnitude that follows or represents the intensity of the light energy.

IAH circuit 364 operates as an approximated matched filter to recover samples of the FSK light waveform pulses, such as the pulses of waveforms 406, 408, in the light packets of light beam 306. IAH circuit 364 integrates electrical signal 365 for an integration time tint according to enable signal 361(i, j), to produce a peak integrated signal, also referred to herein as light sample 358(i, j) or sampled light 358(i, j), which is held at the output of the IAH circuit. The process of enabling light detector 360(i, j) to sample light 306 in accordance with enable signal 361(i, j), to produce light sample 358(i, j), is also referred to herein as "exposing light detector 360(i, j), to produce light sample 358(i, j)." Integration time tint may be approximately a half-period or less of the waveforms of frequencies F0, F1, so that light detector 360(i, j) approximately maximally samples light that is intensity modulated at frequencies F0, F1 of FSK waveforms 406, 408 (for logic levels 0, 1).

An exemplary enable signal waveform "ES" of enable signal 361(i, j) is depicted at the bottom of FIG. 3B. Enable signal 361(i, j) (e.g., waveform ES) may include a series of enable pulses 368 spaced in time from each other by frame period Tframe, i.e., the enable pulses have a pulse repetition rate equal to the frame rate Ffps=1/Tframe of image sensor 356. Each of enable pulses 368 has a pulse width equal to tint to enable IAH circuit 364 to integrate energy over the pulse width, and hold peak integrated signal 358(i, j) at the output until a next pulse in the series of pulses causes the IAH to resample its input. Enable pulses 368 establish and represent a receive sample timeline of light receiver 308. In this way, light detector 360(i, j) samples light energy 306 impinging on position (i, j) of light detector array 359 at frame rate Ffps, to produce sampled light energy as a series of light samples represented at 358(i, j) coinciding with pulses 368. Each of light detectors 360 may simultaneously sample light energy 306, to produce simultaneous light samples 358 (1–M, 1–N) represented in signal 358.

2. Global and Line Array Exposure Modes

Exposure controller 362 generates enable signals 361 in any number of ways to implement different exposure modes of light detector array 359, as is now described.

Exposure controller 362 may expose array 359 (i.e., enable light detectors 360 to sample light 306 in accordance with enable signals 361, to produce light samples 358) in either a global exposure mode or, alternatively, in a sequential line exposure mode. In the global exposure mode, exposure controller 362 generates enable signals 361 so that their respective series of enable pulses 368, i.e., respective integration periods tint, coincide in time with each other, i.e., occur at the same time. The result is that all of light detectors 360 are exposed at the same time, i.e., they all sample light 306 at the same time, once every frame period Tframe, to produce a time-spaced sequence of 2-D images represented in images 358 (which represents all light samples 358(i, j), i=1 . . . M, j=1 . . . N), as represented in FIG. 3B by image sequence IS. Each image in the sequence of images IS includes a 2-D array of light samples corresponding to the 2-D array of light detectors 360.

In the line exposure mode, exposure controller 362 may generate enable signals 361 to expose spatially-successive lines, e.g., successive rows or successive columns, of light detectors 360 one after the other, e.g., one at a time, in a time sequence. For example, exposure controller 361 may generate enables signals 361 so as to expose:
all of light detectors 360 across row i−1 (i.e., all of the N light detectors 360(i−1, 1−N)) at a same time t−τ; then all of light detectors 360 across row i at a same time t; then all of light detectors 360 across row i+1 at a same time t+τ, and so on.

This produces spatially-successive lines of sampled light, spaced in time at sequential times t−τ, t, t+τ, corresponding to light detector rows i−1, i, i+1, and so on. This type of exposure is also referred to as "rolling shutter exposure" because the exposure may be thought of as being implemented using a camera shutter one line of light detectors wide (i.e., that is only wide enough to expose one line of light detectors at a time), that "rolls" or scans sequentially across spatially-successive lines (e.g., the rows or columns) of light detectors in a given direction (e.g., up/down, left/right), to thereby sequentially expose the spatially-successive lines of light detectors. In an embodiment, exposure controller 362 sequentially exposes the spatially-successive lines of light detectors at a rate (referred to as a "line exposure rate") that is greater than both frequencies F0, F1 of the FSK waveforms representing logic levels 0, 1 in transmitted light packets. The line exposure rate is equal to 1/τ.

In a variation of the above-described line exposure mode, the enable signals 361 may be generated to be slightly offset in time but overlapping, so that the exposure of each line time-overlaps the exposure of the spatially-successive line. For example, row i−1 begins its exposure at a time ti−1, and while being exposed (e.g., before time tint expires for row i−1), row i begins its exposure, and while being exposed (e.g., before time tint expires for row i), row i+1 begins its exposure, and so on. This variation of the line exposure mode results in time spaced lines of sampled light corresponding to light detector rows i−1, i, i+1, but with overlapping exposure times for successive rows.

Figure 3C:
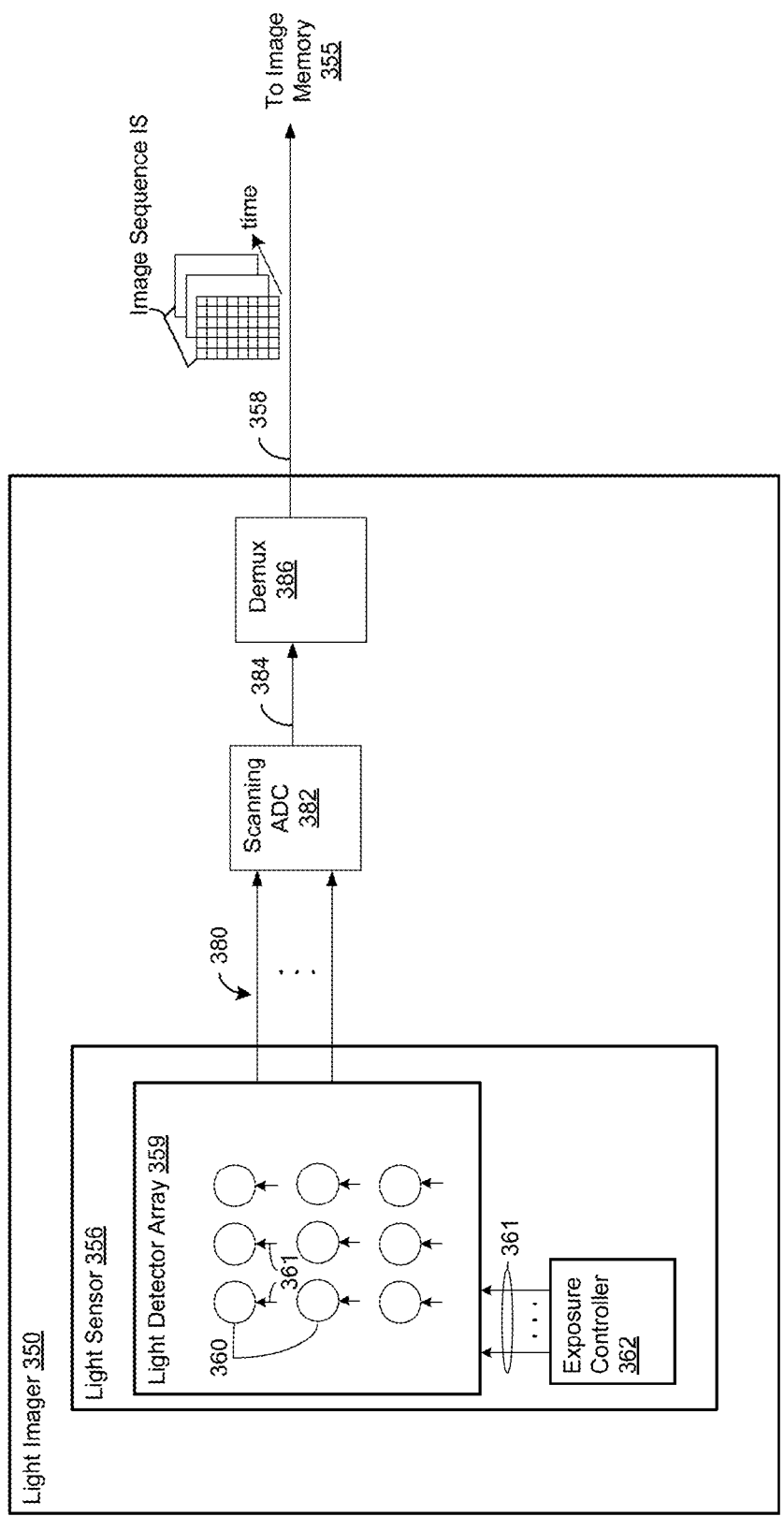
FIG. 3C is a block diagram of a light imager including light sample digitizing modules, according to an embodiment.

FIG. 3C is a block diagram of light imager 350 including light sample digitizing modules, according to an embodiment. Light detectors 360 provide corresponding sampled outputs 380 to a light detector (or pixel) scanning analog-to-digital converter (ADC) 382 that sequentially scans across each of the light detectors and digitizes its corresponding sampled output, to produce sequential, digitized sampled outputs 384. A demultiplexer 386 converts the sequential, digitized sampled outputs into an array of digitized, sampled outputs representative of images 358. Use of scanning ADC 382 and demultiplexer 386 reduces the number of ADCs that might otherwise be required to digitize all of the sampled outputs 380 in parallel.

3. Detector

Detector 352 includes a beam position determiner module 370a, and a SFD detector/demodulator module 370b (collectively referred to as "modules 370" and "modules 370a, 370b"), which cooperate to process the sequence of images stored in memory 355, namely to:
determine a position of each beam recorded in the images, such as an x, y center coordinate of the beam in each image (using beam position determiner 370a); and
from the modulated light recorded at the determined beam positions, both detect any delimiters (SFDs) and demodulate any data bits conveyed by that recorded light (using detector/demodulator 370b).

As described above, light detectors 360 sample FSK waveform pulses in light 306, such as the pulses of waveforms 406, 408 at frequencies F0, F1 (representing logic levels 0, 1), and provide the resulting samples 358 to modules 370a, 370b, e.g., in a sequence of 1-dimensional or 2-dimensional images IS.

To detect a beam position, beam position determiner 370a raster scans the full area of each image in the sequence of images (e.g., in image sequence IS) stored in memory 355, e.g., first, second, third, and fourth sequential images, and so on, in search of recorded light energy that has a correlated position across the sequence of images. In other words, a beam position is determined when beam position determiner 370a detects a spot of modulated light, i.e., modulated light energy, centered on the same position, e.g., an x, y position corresponding to a row, column position, in each of the sequential images. Beam positions for multiple, spatially-separated, simultaneously recorded beams may be determined in this manner.

From each determined position, SFD detector/demodulator 370b associates corresponding light samples 358, over multiple recorded images, to one of: a demodulated data bit level, i.e., logic 0 or logic 1; a demodulated data delimiter; and a detected SFD.

Figure 5:
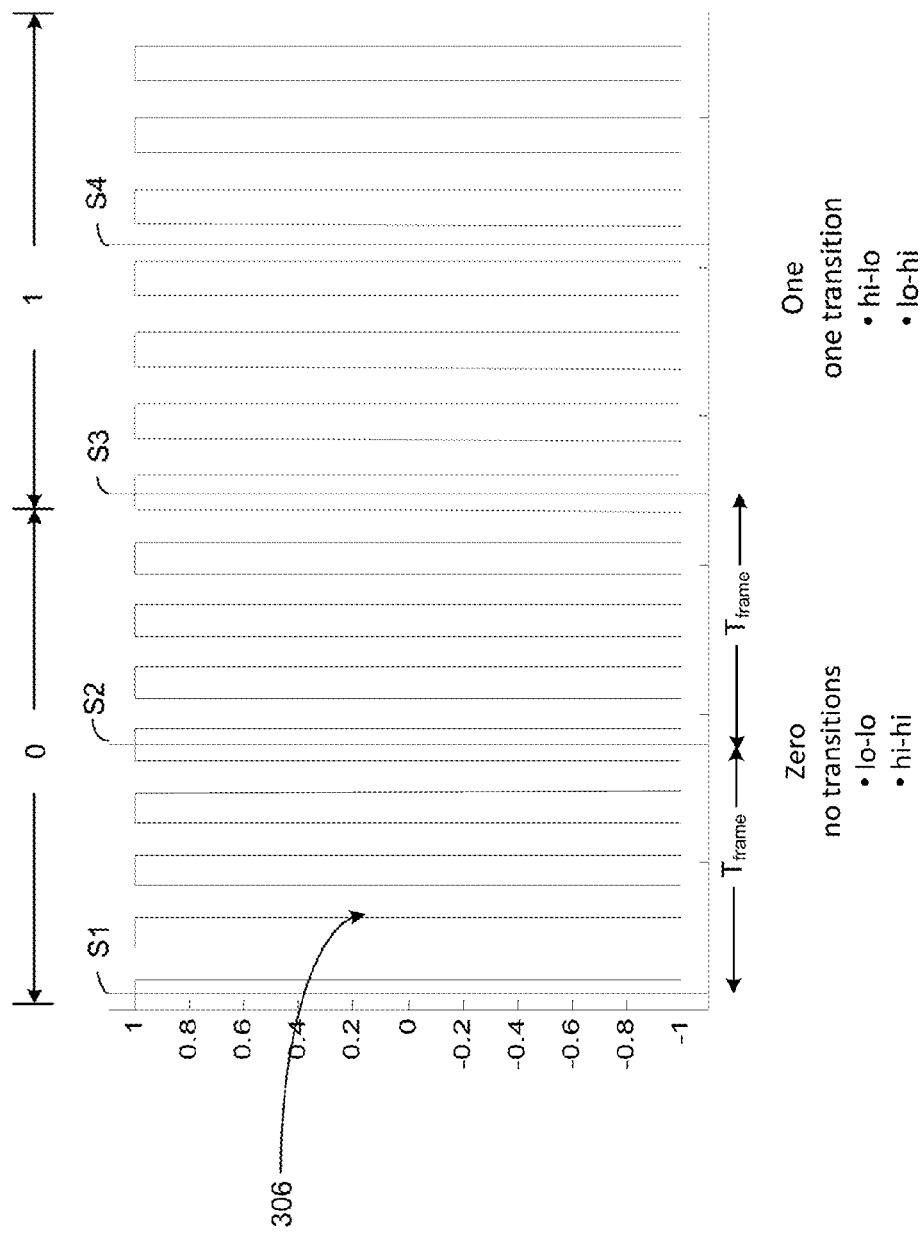
FIG. 5 is a light amplitude/intensity vs. time diagram helpful in understanding how a light receiver detector/demodulator of FIG. 3B associates light samples with demodulated data bits.

FIG. 5 is a light amplitude/intensity (y-axis) vs. time (x-axis) diagram helpful in understanding how SFD detector/demodulator 370b associates light samples 358 with demodulated data bits. In the example of FIG. 5, exemplary light signal 306 conveys a logic 0 followed by a logic 1, i.e., the light is intensity modulated at FSK frequencies F0 and F1 for first and second bit periods, i.e., where each bit period is twice frame period Tframe. On the diagram of FIG. 5, light intensity values of 1, −1 correspond to light intensity values of ON, OFF, (or HIGH, LOW) respectively. Assuming light 306 impinges on a given one of light detectors 360, then that light detector samples light 306 once every frame period Tframe (i.e., twice per bit period), in accordance with a receiver sample timeline, to produce a sequence of time-spaced light samples S1, S2, S3, and S4, with an arbitrary sample phase relative to the bit periods.

During the first bit, or logic 0, period, the frequency/timing relationship between the 120 Hz ON-OFF keying of light 306 and the light sample spacing, i.e., the frame period Tframe, causes consecutive light samples S1 and S2 to be in the same intensity state, i.e., at the same level (either ON/HIGH). In the example of FIG. 5, consecutive samples S1 and S2 are both ON. However, the absolute level, e.g., ON or OFF, depends on the sample phase of the receiver sample timeline. Therefore, if two consecutive light samples indicate consecutive same ON-ON or OFF-OFF states, then detector/demodulator 370b associates this condition with, and demodulates, a logic 0.

During the second bit, or logic 1, period, the frequency/timing relationship between the 105 Hz ON-OFF keying of light 306 and the light sample spacing causes successive light samples S3 and S4 to toggle between states either (ON then OFF, or OFF then ON). In the example of FIG. 5, consecutive samples S3 and S4 transition from ON to OFF. However, in other examples, with different sample phases of the receiver sample timeline, S3 and S4 may toggle from OFF to ON. Therefore, if two consecutive light samples indicate a state transition ON-OFF or OFF-ON, then detector/demodulator 370b demodulates a logic 1.

Modules 370a, 370b also monitor light samples (i.e., images) 358 to detect light modulated with the Illegal frequency, as an indicator of a SFD associated with a light packet. As mentioned above in connection with demodulated data bits, the relationships between the frame period and the frequencies F0, F1 respectively causes detected light in two consecutive images always to be either in the same state, or in different states. However, the relationship between the frame period and the Illegal frequency causes detected light to toggle ON and OFF over four consecutive images in an ON-OFF pattern that cannot occur when the light is modulated at frequencies F1, F1. More specifically, if the light samples indicate any of patterns ON-ON-OFF-OFF, OFF-OFF-ON-ON, ON-OFF-OFF-ON, and OFF-ON-ON-OFF over four consecutive images, then modules 370a, 370b detect the Illegal frequency associated with the data delimiter.

Modules 370a, 370b also monitor light samples 358 to detect light modulated with the HiRate frequency, as an indicator associated with the SFD. An SFD modulated at the HiRate frequency may be more readily detected relative to an SFD modulated at the Illegal frequency when embedded with message data bits (e.g., logic 0, 1) because the HiRate frequency is more easily distinguished from the logic 0, 1 FSK frequencies than the Illegal frequency, which falls between those frequencies.

While light detectors approximately maximally detect frequencies F0, F1 in the modulated light, i.e., produce a near maximum amplitude output in response to the matched frequency, the integration time of the light detectors is too long to respond fully to the much greater HiRate frequency. Therefore, light detectors 360 are suboptimal energy detectors/samplers of the HiRate frequency, and provide an average, e.g., approximately ½ maximum, amplitude output (i.e., sampled output) in response to the HiRate frequency. Therefore, modules 370a, 370b detect the SFD in modulated light beam 306 when light detectors 360 provide the average, lesser amplitude outputs in response to sequential images. Similarly, in a transmit embodiment in which a reduced light intensity serves as an alternative for the HiRate frequency, light detectors 360 provide an average, lesser amplitude indicative of the reduced light intensity.

From recorded sampled light at a determined position in a sequence of images, modules 370a, 370b demodulate frequencies F0, F1 into data bit logic levels, detect the HiRate frequency, and detect the Illegal frequency associated with the SFD. Modules 370a, 370b also detect the number of frames over which each of the above mentioned frequencies extend. In this way, detector 352 deconstructs or determines the modulated light packets conveyed in the recorded light beam(s). Modules 370a, 370b pass such information to controller 354 over a bidirectional interface 374. For example, over interface 374, modules 370a, 370b indicate detected SFDs from recorded light packets to controller 354, and provide demodulated data bits from the light packets to the controller.

4. Controller

Controller 354 includes a memory 376 to store control logic, protocol light packet definitions, and a frame period. Controller 354 provides light packet protocol definitions to detector 352 over interface 374. Based on the information from detector 352 and the contents of memory 376, controller 354 operates and controls receiver 308. Controller 354 also controls imager 350 over interface 374, e.g., the controller may command exposure controller 363 to operate in either of the global exposure mode or the line exposure mode. Controller 354 is also referred to herein as a "protocol processor."

III. MULTI-LIGHT TRANSMITTER

Figure 6:
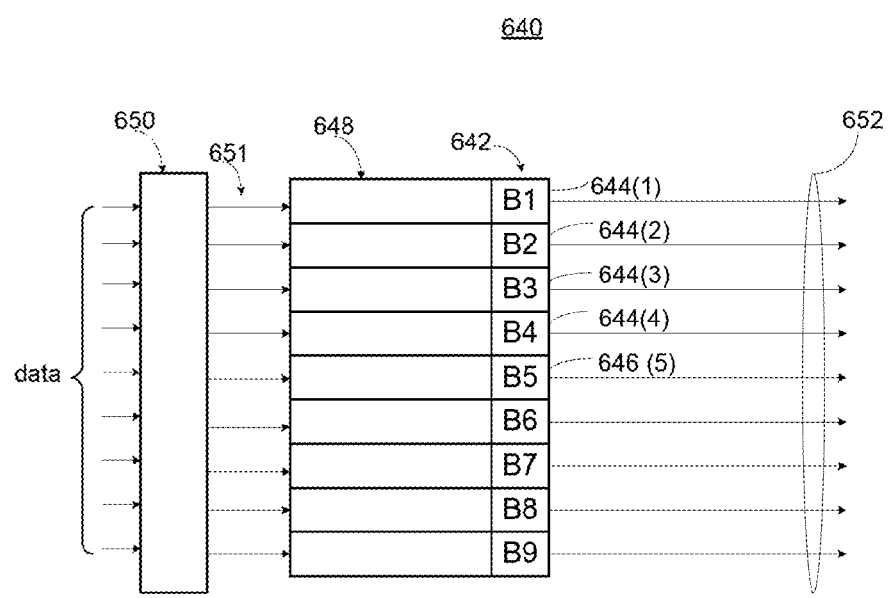
FIG. 6 is a block diagram of an example multi-light transmitter to transmit light packets.

FIG. 6 is a block diagram of an example multi-light transmitter 640 to transmit light packets. Light transmitter 640 includes an array or group of spatially-separated lights 642, which may be spatially-arranged in either 1-dimension or in 2-dimensions.

Transmitter 640 includes light modulators 648, which may be implemented similarly to modulator 309 in FIG. 3, each to modulated light from a corresponding one of lights 642. Transmitter 640 may include a controller 650, including memory and one or more clock and timer circuits similar to those of controller 314. Controller 650 receives multiple parallel data inputs (e.g., one per light modulator) from data sources not shown, and generates modulator commands 651 in parallel to control multiple modulators 648, similar to the manner in which commands 320 control modulator 309. In an alternative embodiment, controllers, such as controller 314, may be incorporated into each of modulators 648 separately.

In response to commands 651, modulators 648 modulate their corresponding lights 642 to transmit their respective light packets in spatially-separated light beams 652 according to the light packet definition of FIG. 4B, to convey data bits received over the data inputs. In response to commands 651, modulators/lights 648/642 may transmit their respective light packets with any number of different inter-packet timing relationships.

For example, modulators/lights 648/642 may transmit their respective light packets simultaneously with each other. Alternatively, the light packets may be transmitted in a serial manner, one after the other. Alternatively, the light packets may be transmitted with their respective start times offset slightly with respect to each other. Any combination of such inter-packet timing relationships is possible.

IV. MULTI-PHASE SAMPLING

In the examples described above, light transmitter 304 transmits light packets modulated to convey sequential fields, including an SFD, followed by a message including a series of data bits. A data bit is conveyed at a transmit bit rate as an FSK frequency representing a value of the bit, where the transmit bit rate and the FSK frequency are harmonically related. Ideally, light receiver 308 samples the light packets when received at the receive sample rate, Ffps, based on a receive sample timeline (e.g., timeline ES in FIG. 3B) that is also harmonically related, and thereby synchronized, to the transmit bit rate and the FSK frequency.

In practice, however, the transmit bit rate (and FSK frequency) and the receive sample rate may not be synchronized, i.e., they are asynchronous, because of differences between transmitter and receiver clocks/timers. When the transmit bit rate (and FSK frequency) and the receive sample rate are asynchronous, then, at the receiver, the FSK waveforms corresponding to the transmitted data bits and the receive sample times gradually "slip" or "drift" by each other. As the FSK waveforms gradually slip by the sample times of the receive sample timeline, occasionally, a sample time will coincide with an FSK waveform transition from ON-to-OFF or OFF-to-ON. That is, the sample integration time tint of light detectors 360 may coincide with the FSK waveform transition. This may result in an indeterminate level of a light sample, i.e., a level reflecting that the light is neither fully ON nor fully OFF, and yield an erroneous bit level determination, which may increase a packet or bit error rate of the light receiver.

Assuming such asynchronous timing between the transmit bit rate and the receive sample rate, techniques that result in multiphase sampling of received light packets, i.e., that result in multiple sampling phases at the receiver, reduce a likelihood that any given one of the multiple sampling phases will coincide with FSK waveform transitions, and thereby reduce the likelihood of bit demodulation errors. Therefore, multiphase sampling advantageously mitigates the deleterious effects mentioned above that arise from asynchronous transmit and receive timing. Accordingly, described below are multiphase sampling embodiments, including two multiphase transmission embodiments and a multiphase receive sampling embodiment, that improve the bit error rate performance of an asynchronously sampling light receiver.

A. Multiphase Transmission

Two multiphase transmission embodiments, namely, sequential multiphase transmission and parallel multiphase transmission, are now described, generally. In both embodiments, a light transmitter, e.g., one of transmitters 304 and 640, transmits multiple light packets to light receiver 308. Each of the multiple light packets includes a same, i.e., redundant, message comprising a series of bits, each bit being represented as light that is intensity modulated over a bit period at a frequency indicative of the bit, in the manner described above. The light transmitter issues controller commands 320/651 to vary transmit start-times of the multiple same messages (carried in the multiple light packets) relative to each other and an anticipated, receive sample timeline established by light receiver 308 that is asynchronous to the transmit bit rate/period and the frequency. The different message start-times establish slightly different receive sample phases of the receive sample timeline, one for each of the same messages. In other words, the different transmit start-times of the multiple messages relative to each other permit light imager 350 in light receiver 308 to sample each message at a different phase of the fixed sample timeline, which is asynchronous to the bit period and the frequency.

Light receiver 308 receives and samples the multiphase (or time-offset) light packets based on the asynchronous receive sample timeline, to produce samples for each received message that coincide in time with the corresponding one of the different sample phases (also referred to herein simply as "different phases") established for that message. In other words, due to the slightly different start-times of each message, receiver 308 samples each message at a slightly different phase of the receive sample timeline. This produces phase-offset samples for each of the same messages. Receiver 308 demodulates each of the received same messages based on the samples for that message, which may include random demodulation errors due to the asynchronous sampling in the receiver. Then receiver 308 constructs one best message based on the multiple demodulated messages, i.e., the receiver combines the multiple demodulated messages into a single best message.

The two embodiments of multiphase transmission are now described more fully below.

1. Sequential Multiphase Transmission Via Single Light

Figure 7:
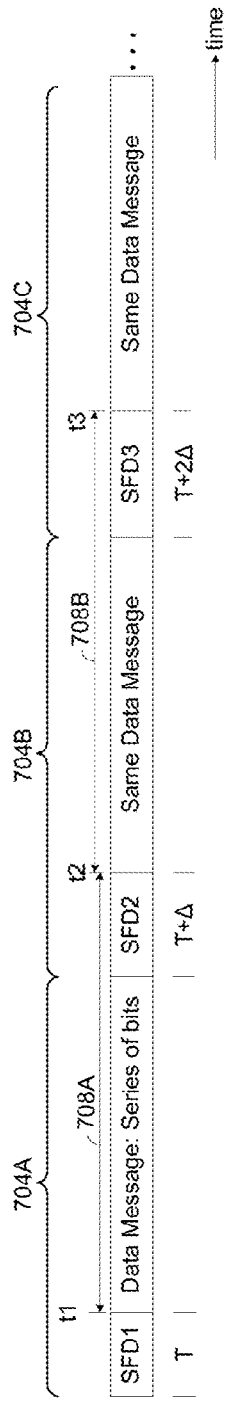
FIG. 7 is a timing diagram of exemplary light packets transmitted by a light transmitter, in accordance with sequential multiphase transmission.

A first embodiment of multiphase sampling, referred to herein as sequential multiphase transmission via a single light/transmit source, or simply sequential multiphase transmission, is described with reference to FIG. 7. FIG. 7 is a timing diagram of exemplary transmit light packets 704 transmitted by light transmitter 704, in accordance with sequential multiphase transmission. Light packets 704 include contiguous, sequential light packets 704A-704B, each formatted, in accordance with commands 320 of transmitter 304, to include a variable length SFD followed by a message comprising a series of data bits. Each of the light packets 704 includes (i) an SFD having a time duration that is different from all of the other SFDs, and (ii) a message, i.e., series of data bits, that is the same across the messages. Light packets 704 are transmitted contiguously one after the other, in sequence.

As depicted in FIG. 7, successive SFDs SFD1, SFD2, and SFD3 (of respective light packets 704A, 704B, and 704C) have respective time durations T, T+Δ, and T+2Δ that increase monotonically, from the initial time duration of the SFD1, by an increment of time Δ. Time increment Δ may be approximately equal to or greater than twice tint. The result is that successive data messages have respective successive start times t1, t2 and t3 separated in time from each other, i.e., one from the next, by successive time separations, e.g., 708A, 708B, that also increase incrementally by time increment Δ. The effect is to introduce multiphase offsets between the successive repeated data messages with respect to an arbitrary, fixed receive sample timeline.

2. Parallel Multiphase Transmission Via Multiple Light Sources

Figure 8:
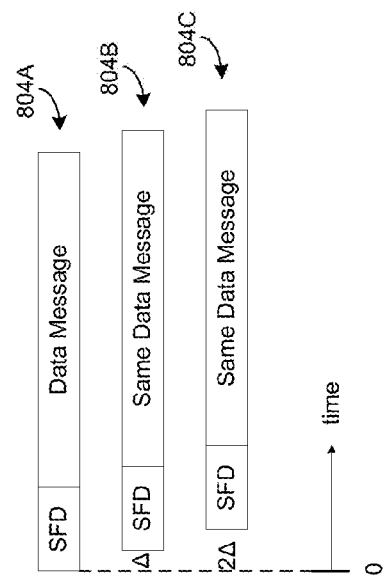
FIG. 8 is a timing diagram of exemplary light packets transmitted by a light transmitter, in accordance with parallel multiphase transmission.

A second embodiment of multiphase sampling, referred to herein as parallel multiphase transmission via multiple lights/transmit sources, or simply parallel multiphase transmission, is described with reference to FIG. 8. FIG. 8 is a timing diagram of exemplary transmit light packets 804 transmitted by a light transmitter, such as multi-light transmitter 640 in accordance with parallel multiphase transmission. Light packets 804 include parallel, time-staggered (i.e., phase-offset) light packets 804A-804B, each transmitted by a respective one of lights 642(1)-642(3) of multi-light transmitter 640. Each of the light packets 804 includes (i) a fixed length SFD having a time duration that is the same as that of all of the other light packets (in contrast to the variable length SFDs of FIG. 7), and (ii) a message, i.e., series of data bits, that is the same across the messages.

Successive packets 804A, 804B, and 804C have respective successive start times (i.e., the times at which the SFDs start) that increase monotonically from a reference time 0 by an increment of time Δ. Since the SFDs all have the same time duration, the successive data messages of successive packets 804A, 804B, and 804C also have respective successive start times that increase monotonically from time 0. The effect is to introduce multiphase offsets between the time-overlapping, time-staggered, successive repeated data messages.

3. Receive Processing of Multiphase Transmission

Light receiver 308 processes sequential multiphase light packets 704 or parallel multiphase light packets 804 as described above in connection with FIGS. 3B and 5. That is, at receiver 308, sequential multiphase light packets 704, or parallel multiphase light packets 804, are each asynchronously sampled and demodulated to recover their repeated data messages, each of which includes the same series of bits across the repeated light packets.

Due to the multiphase offsets of the data messages introduced on the transmit end, at receiver 308, each of the messages is periodically sampled (i.e., at the receiver frame rate) across its duration at slightly different or offset sample times relative to the other messages, thereby increasing the likelihood that most of the sample times will avoid FSK waveform edge transitions and, thus, demodulated bit errors. In this manner, light receiver 308 recovers or demodulates multiple copies of the same data message, each of which may include one or more demodulated bit errors due to the asynchronous sampling. Light receiver 308 combines the multiple copies using, e.g., bit voting, to construct a single, best message representative of the transmitted messages, as will be described more fully below.

Figure 9:
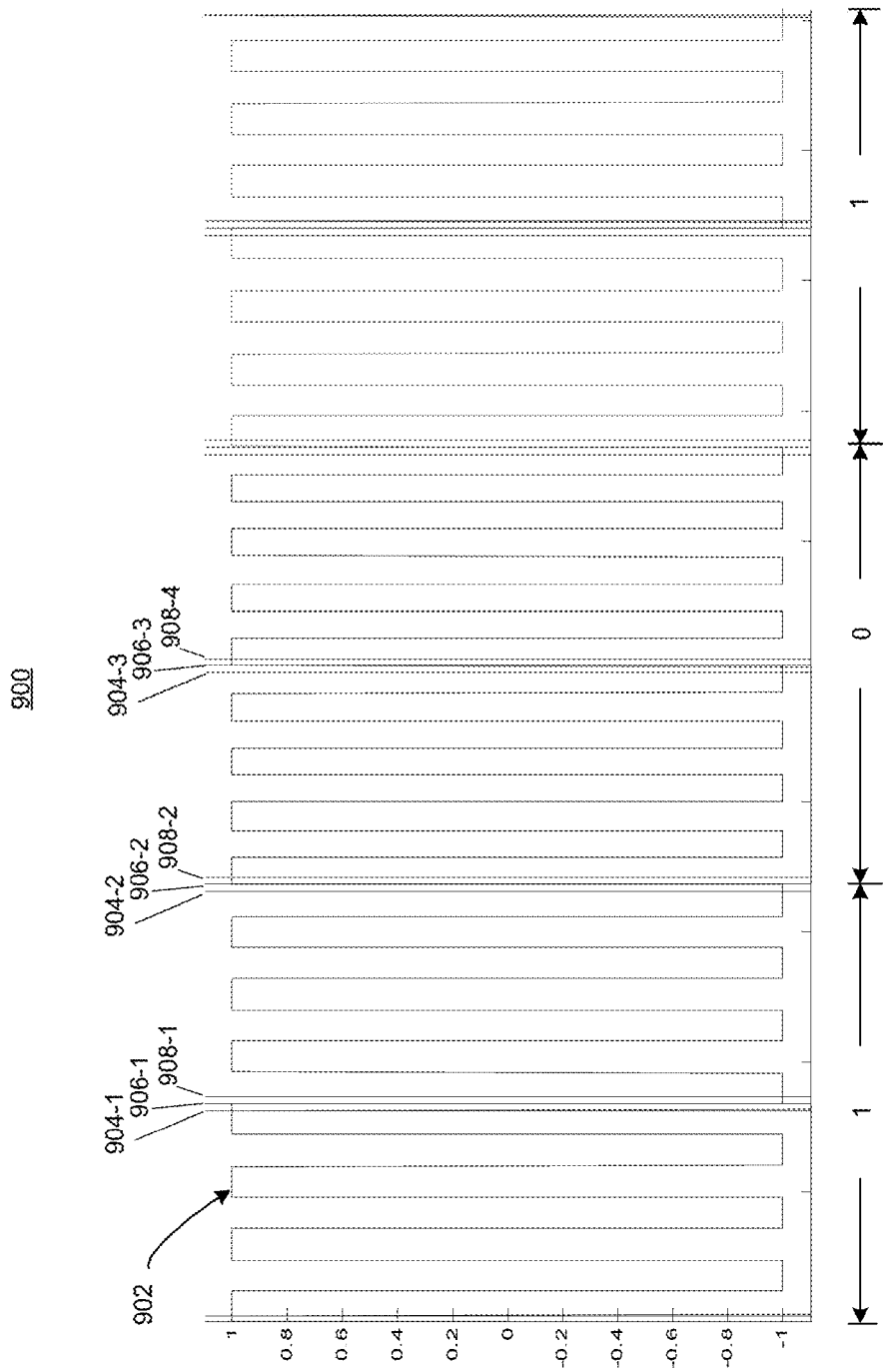
FIG. 9 is an example timing diagram at a light receiver corresponding to the sequential and parallel multiphase transmission embodiments.

FIG. 9 is an example timing diagram 900 at light receiver 308 corresponding to the sequential and parallel multiphase transmission embodiments. The example of FIG. 9 assumes that the multiphase light packets transmitted and then received at receiver 308 include three light packets carrying the same data message comprising a series of data bits 1-0-1. Each of the three light packets conveys its same series of data bits 1-0-1 as three light intensity modulated FSK waveforms at frequencies F1-F0-F1 corresponding to the data bits. In FIG. 9, the three transmitted data messages (where each of the data messages includes the three FSK waveforms representing 1-0-1) are superimposed in time, one on top of the other, so as to be represented by a single, superimposed waveform 902 representing the series of bits 1-0-1.

Such waveform/time superposition of the transmitted waveforms in FIG. 9 effectively removes the multiphase time offsets introduced between the data messages on the transmit end, and, when viewed from the timing perspective of the receiver, introduces those time offsets into the sample times established by the single receive sample timeline for the three superimposed light packets. Accordingly, as depicted in FIG. 9, the receiver samples:

the first (superimposed) light packet at a first sample phase, to produce a first series of sample times 904-1, 904-2, 904-3, and so on;

the second (superimposed) packet at a second sample phase, to produce a second series of sample times 906-1, 906-2, 906-3, and so on, slightly offset in time with respect to the first sample phase; and the third packet at a third sample phase, to produce a third series of sample times 908-1, 908-2, 908-3, etc., slightly offset in time with respect to the first and second series of sample times.

Each phase/series of samples, e.g., 904, is slightly offset in time/phase with respect to the succeeding phase/series of samples, e.g., 906, by the time increment or offset Δ established at the light transmitter. As seen in FIG. 9, some of the samples fall close to, or coincide with, FSK waveform edge transitions, which may result in some erroneous bit level determinations. However, other samples avoid the FSK waveform transitions because they are offset in time from those that fall close to, or coincide with, the transitions, and thereby result in correct bit level determinations.

The receiver recovers/demodulates a separate message corresponding to each of the three phases/series of samples (e.g., a first demodulated message based on samples 904, a second demodulated message based on samples 906, and a third demodulated message based on samples 908), to produce three separate demodulated messages, and constructs a final, or best, message based on the three demodulated messages.

FIG. 10 is a diagram of an example 1000 of multiphase transmission and reception, in which transmitter 304 or 640 transmits three multiphase light packets each carrying the same 10-bit data message Psent depicted in FIG. 10, with multiphase offsets. Light packets Psent may be transmitted in accordance with either sequential or parallel multiphase transmission embodiments described above.

Receiver 308 receives and samples the three light packets with respective sample phases 1, 2, and 3 and demodulates the light packets according to each of the three sample phases, to produce corresponding demodulated packets P1, P2, and P3, each including 10-bits corresponding to the 10-bits of transmitted light packet Psent, as depicted in FIG.

10. Several demodulation bit errors result when asynchronous receive samples coincide with FSK waveform transitions.

Receiver 308 performs forward error correction (FEC) on the three demodulated packets P1-P3, to construct a best packet Pfec. In an embodiment, the FEC includes majority bit voting across corresponding bits of the three demodulated light packets P1-P3, to produce best packet Pfec.

B. Multiphase Receive Sampling Via Receiver Rolling Shutter Exposure

A third embodiment of multiphase sampling, referred to herein as multiphase sampling via receiver rolling shutter, is described with reference to FIGS. 3B, 11 and 12. In this embodiment, transmitter 304 may transmit as few as one light packet carrying a data message. That is, the redundant light packet message transmissions described above in connection with the multiphase transmission embodiments is unnecessary, because, in the rolling shutter embodiment, multiple sampling phase offsets are introduced in light receiver 304 using a rolling shutter.

Figure 11:
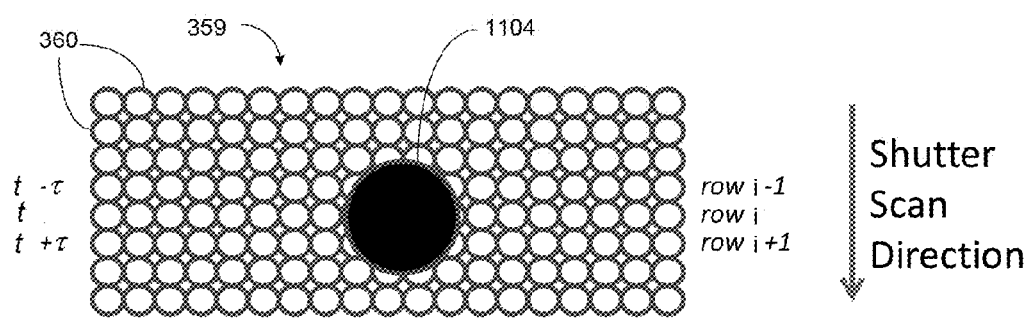
FIG. 11 is a diagram of an example front view of a portion of a light detector array, including rows and columns of light detectors.

FIG. 11 is a diagram of an example front view of a portion of light detector array 359, including rows and columns of light detectors 360. A light beam 1104 comprising an intensity modulated light packet, formatted to include an SFD and a data message, including a series of bits, illuminates spatially-successive lines, e.g., rows i−1, i, and i+1, of light detectors 360 in array 359, simultaneously.

Under the control of exposure controller 362, light detector array 359 operates in the line exposure mode, i.e., as a rolling shutter, as described above in connection with FIG. 3B, to expose the simultaneously illuminated, spatially-successive lines, e.g., rows i−1, i, and i+1, of detectors 360 in sequence, at spaced apart times t−τ, t, t+τ, at the line exposure rate, to produce a group of sequential lines of light samples at the multiphase sample times t−τ, t, t+τ.

Figure 12:
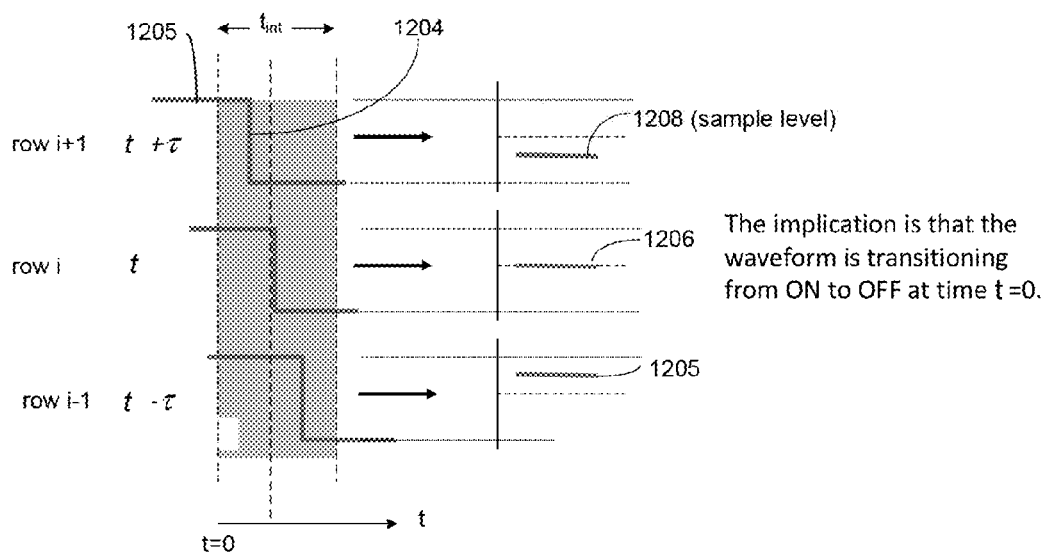
FIG. 12 is an illustration of an alignment between (i) a transition of an FSK waveform in a light beam that occurs at a time t=0, and (ii) three light sample integration times coinciding with sequential sample times for successive rows of light detectors that are exposed sequentially in time.

FIG. 12 is an illustration of an alignment between (i) a transition 1204 of an FSK waveform 1205 in light beam 1104 that occurs at a time t=0, and (ii) the three light sample integration times tint coinciding with the sequential sample times t−τ, t, t+τ for rows i−1, i, and i+1 of light detectors 306. In FIG. 10, the three integration times tint are depicted as being time-aligned with other, which effectively shifts the FSK waveform transition 1204 (left or right) accordingly to indicate how much of the ON period of the FSK waveform is integrated over the time tint for each of the sample times t−τ, t, t+τ. Multiphase sample times t−τ, t, t+τ produce corresponding multiphase sample levels 1205, 1206, and 1208, corresponding to rows i−1, i, and i+1 of light detectors 306, based on where the FSK transition 1204 falls during the respective integration time tint for the given sample.

Detector 370 of light receiver 308 may determine a level and/or behavior of the FSK waveform 1205 based on the multiphase samples 1205, 1206, and 1208 from the successive rows, e.g., based on a comparison of each of the samples to the other samples. For example, the sample levels of the FSK waveform 1205 decrease as time increases from t−τ to t to t+τ, indicating that the FSK waveform is transitioning from ON to OFF at time t=0.

As mentioned above, exposure controller 362 exposes successive lines of detectors at the line exposure rate, to produce a group of sequential lines of sampled light energy, from which a light intensity level, corresponding to an FSK waveform level, may be determined. Exposure controller 362 repeats such exposure multiple times, e.g., twice, per bit period, to produce time-spaced groups of sequential lines of sampled light.

Therefore, detector 370 may determine multiple intensity levels, e.g., multiple FSK waveform levels, per bit period, each determined level corresponding to one of the groups of sequential lines of sampled light. As described above in connection with FIGS. 3B and 5, detector 370 may determine an FSK frequency, and corresponding logic value, based on the multiple determined intensity levels, e.g., consecutive intensity levels.

V. METHOD FLOWCHARTS

A. Multiphase Transmission

FIG. 13 is a flowchart of an example method 1300 summarizing multiphase transmission embodiments described above.

1305 includes transmitting multiple light packets each formatted to include a same message comprising a series of bits, each bit represented as light that is intensity modulated over a bit period at a frequency indicative of the bit.

1310 includes varying transmit start-times of the multiple messages relative to each other to permit a light receiver to sample each message at a different phase of a fixed sample timeline in the light receiver that is asynchronous to the bit period and the frequency. In other words, the varying transmit start-times establish different transmit time offsets for the messages, which results in different sampling phases of the sample timeline.

1315 includes receiving the multiple transmitted light packets at different times according to the different start-times.

1320 includes sampling the received multiple light packets based on the asynchronous sample timeline, to produce samples for each received message that coincide in time with a corresponding one of the different phases.

1325 includes demodulating each of the sampled messages, to produce multiple demodulated messages.

1330 includes constructing a series of data bits representative of the same message based on the multiple demodulated messages.

In a parallel multiphase transmission embodiment, 1305 and 1310 include transmitting the multiple light packets as multiple, spatially separated light packets so that all of the light packets partially overlap in time, and varying the start-times of the multiple light packets and, as a result, the start-times of their respective messages, so that the messages have successive start-times, so as to establish the different phases as successive sample phases. In this embodiment, 1315 and 1320 include receiving and sampling multiple spatially-separated received light packets.

In a sequential multiphase transmission embodiment, wherein each of the multiple light packets includes sequential fields including a delimiter having a variable time duration followed by the same message, 1305 and 1310 include transmitting the multiple light packets as successive contiguous light packets, and varying the time durations of the successive delimiters with respect to each other and the sample timeline to establish the different phases.

B. Multiphase Receive Sampling

Figure 14:
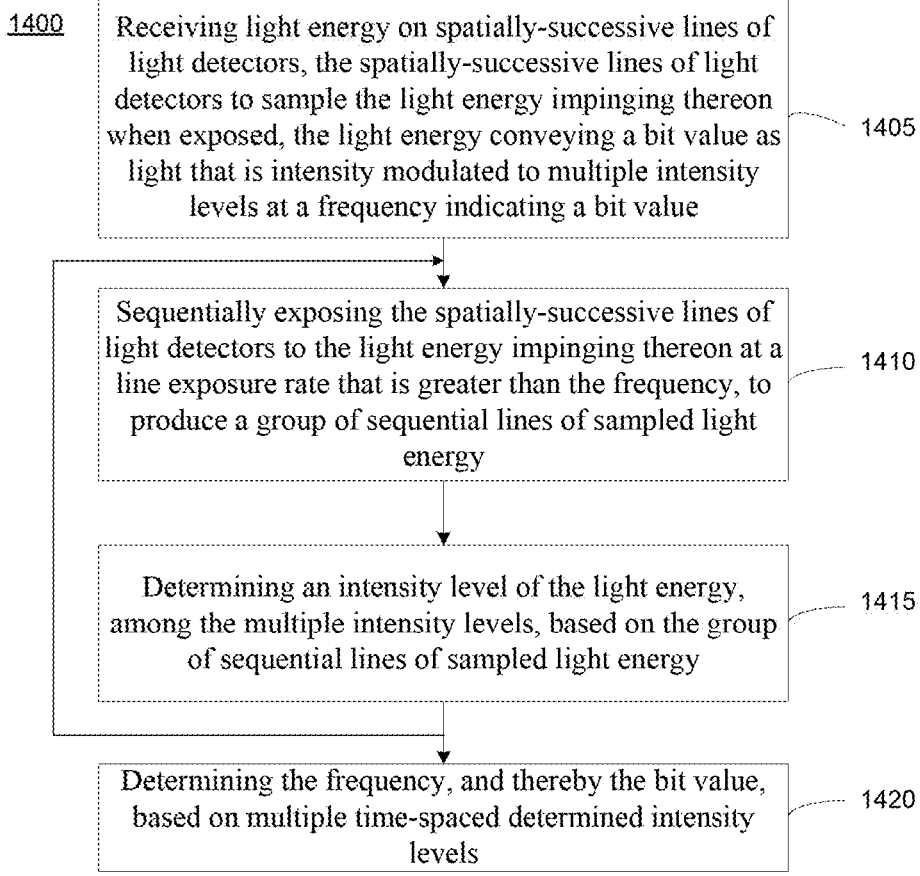
FIG. 14 is a flowchart of an example method summarizing a multiphase receive sampling embodiment.

FIG. 14 is a flowchart of an example method 1400 summarizing the multiphase receive sampling embodiment described above.

1405 includes receiving light energy on spatially-successive lines of light detectors, the spatially-successive lines of light detectors to sample the light energy impinging thereon when exposed, the light energy conveying a bit value as light that is intensity modulated to multiple intensity levels at a frequency indicating a bit value.

1410 includes sequentially exposing the spatially-successive lines of light detectors to the light energy impinging thereon at a line exposure rate that is greater than the frequency, to produce a group of sequential lines of sampled light energy.

1415 includes determining an intensity level of the light energy, among the multiple intensity levels, based on the group of sequential lines of sampled light energy.

The sequentially exposing 1410 is repeated at multiple spaced-apart times per bit period, to produce multiple, time-spaced groups of sequential lines of sampled light energy per bit period.

The determining 1415 is repeated to determine an intensity level based on each of the multiple time-spaced groups of sequential lines of the light energy, to produce multiple time-spaced determined intensity levels per bit period.

1420 includes determining the frequency, and thereby the bit value, based on the multiple time-spaced determined intensity levels.

VI. COMPUTER SYSTEM

Figure 15:
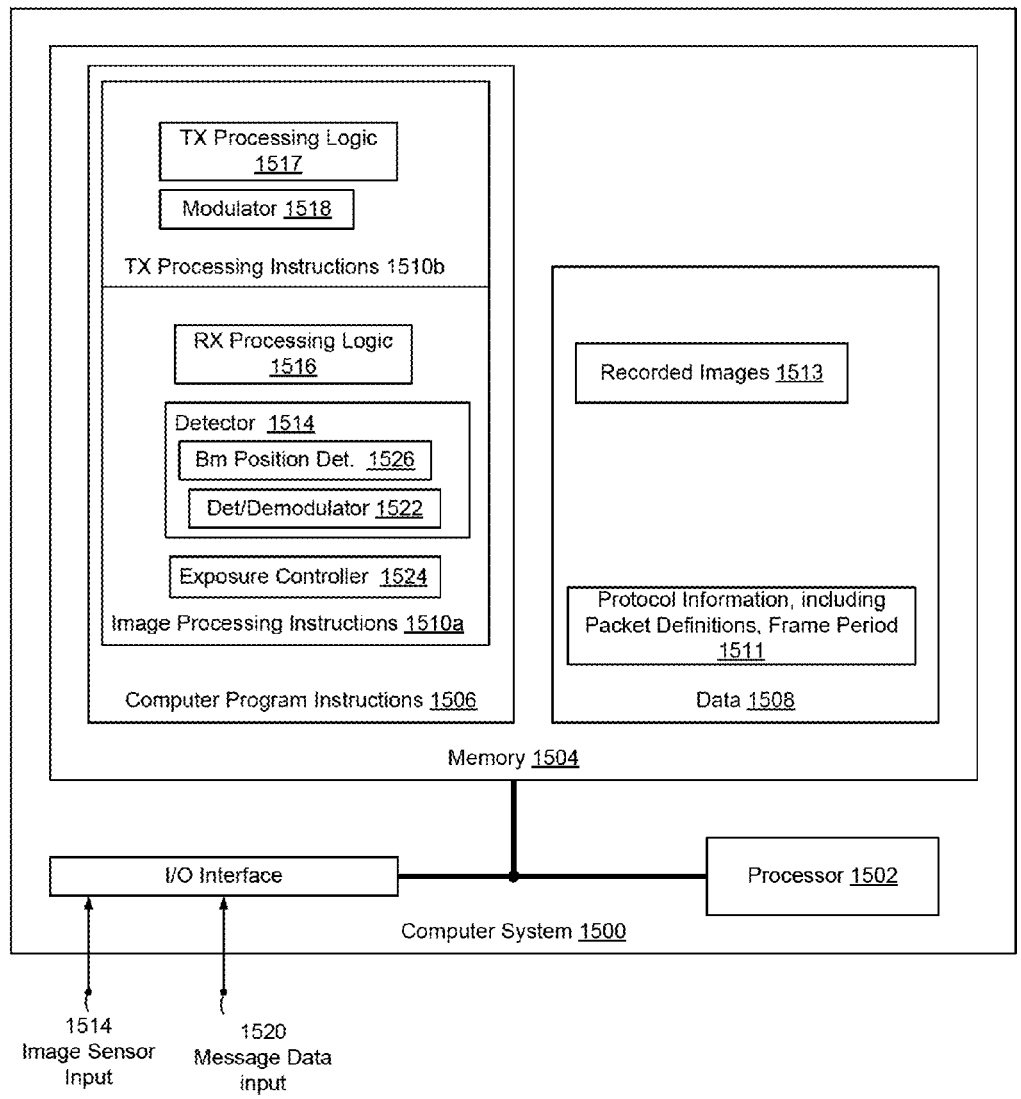
FIG. 15 is a block diagram of an example computer processor system configured for multiphase sampling processing.

FIG. 15 is a block diagram of an example computer processor system 1500 configured for multiphase sampling processing, including light transmitter processing such as light modulation, etc., and light receiver processing such as demodulation, etc., in accordance with examples described herein. In FIG. 15, various transmit and receive components/modules of computer system 1500 are depicted together for descriptive convenience. It is understood that various ones of the components/modules may reside in separate light transmitter and light receiver systems, as appropriate.

Computer system 1500 may include one or more instruction processing units, illustrated here as a processor 1502, which may include a processor, one or more processor cores, or a micro-controller.

Computer system 1500 may include memory, cache, registers, and/or storage, illustrated here as memory 1504.

Memory 1504 may include one or more non-transitory computer readable mediums encoded with a computer program, including instructions 1506.

Memory 1504 may include data 1508 to be used by processor 1502 in executing instructions 1506, and/or generated by processor 1502 during execution of instructions 1506. Data 1508 includes protocol information 1511, including light packet protocol definitions, frame periods, and so on, and recorded images 1513 from an imager, such as a camera, which may be received through the I/O interface.

Instructions 1506 include instructions 1510a for light receiver (RX) processing of recorded images in accordance with one or more multiphase sampling embodiments, as described in one of the examples above. Instructions 1510a include instructions for implementing a detector 1514, a receiver control/protocol processor 1516, and an exposure controller 1524, as described in one or more examples above. Detector instructions 1514 further include instructions for implementing a detector/demodulator 1522 such as a FSOOK detector/demodulator, and a beam position determiner 1526, as described in one or more examples above.

Instructions 1506 may also include instructions 1510b for a light transmitter operating in accordance with one or more multiphase sampling embodiments described above. Instructions 1510b include instructions 1517 for controlling the transmitter, and 1518 for implementing a modulator, such as a FSOOK modulator, as described in one or more examples above.

VII. WIRELESS COMMUNICATION RECEIVER

Figure 16:
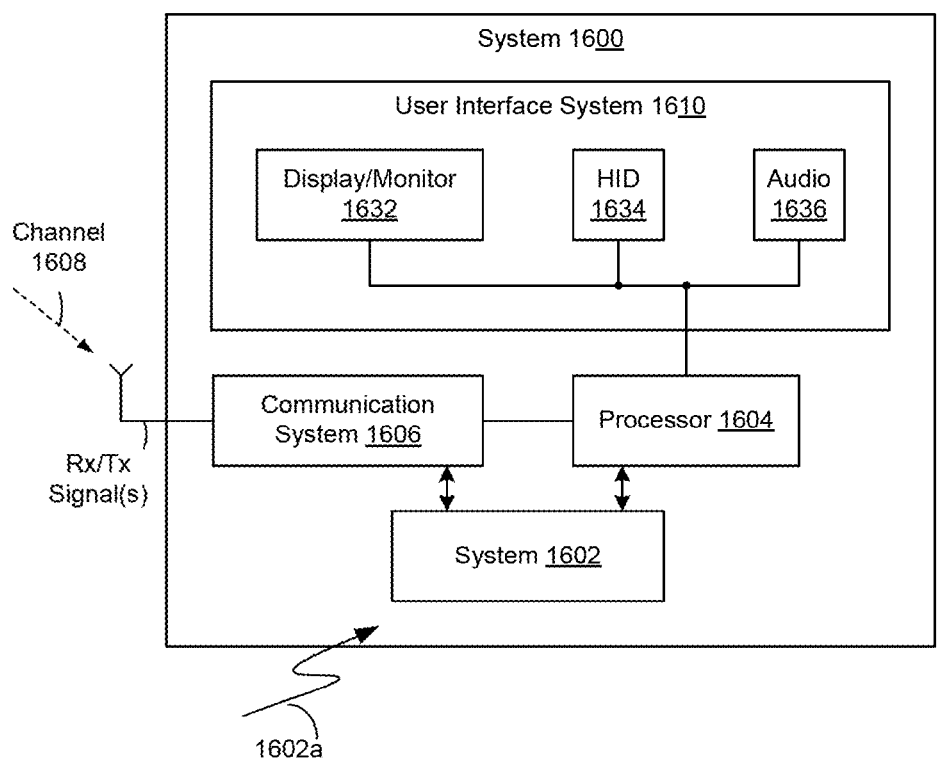
FIG. 16 is a block diagram of an example system including a system or apparatus to sample and record light beams as a sequence of images and process the recorded images in accordance with one or more embodiments described herein.

FIG. 16 is a block diagram of an example system 1600 including a system or apparatus 1602 to sample and record light beams 1602a as a sequence of images and process the recorded images in accordance with one or more multiphase sampling embodiments.

System 1602 may be implemented as described in one or more examples herein. System 1602 may be implemented as a light receiver as described in one or more examples herein. System 1600 may include a processor 1604.

System 1600 may include a communication system, including a transceiver, 1606 to interface between system 1602, processor system 1604, and a communication network over a channel 1608. Communication system 1606 may include a wired and/or wireless communication system.

System 1600 or portions thereof may be implemented within one or more integrated circuit dies, and may be implemented as a system-on-a-chip (SoC).

System 1600 may include a user interface system 1610 to interface system 1610.

User interface system 1610 may include a monitor or display 1632 to display information from processor 1604.

User interface system 1610 may include a human interface device (HID) 1634 to provide user input to processor 1604. HID 1634 may include, for example and without limitation, one or more of a key board, a cursor device, a touch-sensitive device, and or a motion and/or imager. HID 1634 may include a physical device and/or a virtual device, such as a monitor-displayed or virtual keyboard.

User interface system 1610 may include an audio system 1636 to receive and/or output audible sound.

System 1600 may further include a transmitter system to transmit signals from system 1600.

System 1600 may correspond to, for example, a computer system, a personal communication device, and/or a television set-top box.

System 1600 may include a housing, and one or more of communication system 1602, digital processor system 1612, user interface system 1610, or portions thereof may be positioned within the housing. The housing may include, without limitation, a rack-mountable housing, a desk-top housing, a lap-top housing, a notebook housing, a net-book housing, a set-top box housing, a portable housing, and/or other conventional electronic housing and/or future-developed housing. For example, communication system 1602 may be implemented to receive a digital television broadcast signal, and system 1600 may include a set-top box housing or a portable housing, such as a mobile telephone housing. System 1600 may be implemented in a smartphone, or may be implemented as part of a wireless router.

Methods and systems disclosed herein may be implemented in hardware, software, firmware, and combinations thereof, including discrete and integrated circuit logic, application specific integrated circuit (ASIC) logic, and micro-controllers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program, method, apparatus, and system embodiments are described herein.

VIII. FURTHER EXAMPLE EMBODIMENTS

An embodiment includes a non-transitory computer readable medium encoded with a computer program, including instructions to cause a processor to:
- cause one or more lights of a light transmitter to transmit multiple light packets each formatted to include a same message comprising a series of bits, each bit represented as light that is intensity modulated over a bit period at a frequency indicative of the bit; and
- vary transmit start-times of the multiple messages relative to each other and a light receiver fixed sample timeline that is asynchronous to the bit period and the frequency, to thereby establish different (sample) phases of the sample timeline, one for each of the messages. In other words, the instructions cause the processor to vary the transmit start-times of the multiple messages relative to each other to permit the light receiver to sample each message at a different phase of the fixed sample timeline, which is asynchronous to the bit period and the frequency.

The computer readable medium may further include instructions to cause the processor to:
- cause an light imager configured to receive the transmitted multiple light packets to sample the received multiple light packets based on the asynchronous sample timeline, to produce samples for each received message that coincide in time with the one of the different sample phases established for that message;
- demodulate each of the sampled messages, to produce multiple demodulated messages; and
- construct a series of data bits representative of the same message based on the multiple demodulated messages.

The sample timeline may include consecutive sample times spaced apart so as to produce at least two samples per bit period.

The instruction to cause the light imager to sample may further include instructions to cause the light imager to sample the received light packets for a sample integration time to produce each of the samples, Adjacent ones of the different sample phases may be separated by at least twice the integration time.

The instruction to cause one or more lights of a transmitter to transmit may further include instructions to cause the processor to cause multiple, spatially separated lights each to transmit a respective one of the multiple light packets so that all of the light packets partially overlap in time.

The instructions to cause the processor to vary may further include instructions to cause the processor to vary start-times of the multiple light packets and, as a result, the start-times of their respective messages, so that the messages have successive start-times to establish the different sample phases as successive sample phases.

Each of the multiple light packets may include sequential fields including a delimiter having a variable time duration followed by the same message.

The instruction to cause one or more lights of a transmitter to transmit may further include instructions to cause the processor to cause a light to transmit the multiple light packets as successive contiguous light packets; and The instructions to cause the processor to vary may further include instructions to cause the processor to vary the time durations of the successive delimiters with respect to each other and the sample timeline, to thereby establish the different sample phases.

The different sample phases may include a first sample phase followed by remaining successive sample phases, and phase differences between the first phase and each of the remaining successive phases increase monotonically.

The different sample phases may all be separated from each other by a time offset that is less than 1/frequency.

Each of the multiple light packets may be further formatted to include sequential light intensity modulated fields, including a delimiter followed by the same message,
- each bit in the message being represented as light that is intensity modulated, for the bit period, at one of first and second frequencies indicative of one of first and second bit values, respectively, and
- the delimiter being represented as light that is intensity modulated, for a delimiter period, at a third frequency that is greater than each of the first and second frequencies.

Another embodiment includes a non-transitory computer readable medium encoded with a computer program, including instructions to cause a processor to:
- cause a light detector array including spatially-successive lines of light detectors to sample light energy impinging thereon when exposed, the light energy conveying a bit value as light that is intensity modulated to multiple intensity levels at a frequency indicating a bit value;
- sequentially expose the spatially-successive lines of light detectors to the light energy impinging thereon at a line exposure rate that is greater than the frequency, to produce a group of sequential lines of sampled light energy; and
- determine an intensity level of the light energy, among the multiple intensity levels, based on the group of sequential lines of sampled light energy.

The computer readable medium may further include instructions to cause the processor to:
- expose the spatially-successive lines of light detectors at the line exposure rate at multiple spaced-apart times per bit period, to produce multiple, time-spaced groups of sequential lines of sampled light energy per bit period,
- wherein the instructions to cause the processor to determine further include instruction to cause the processor to:
- determine an intensity level based on each of the multiple time-spaced groups of sequential lines of the light energy, to produce multiple time-spaced determined intensity levels per bit period; and
- determine the frequency, and thereby the bit value, based on the multiple time-spaced determined intensity levels.

The line exposure rate may be asynchronous to both the frequency and a bit rate equal to an inverse of the bit period.

The light energy may convey one of first and second bit values as light that is intensity modulated to the multiple intensity levels at one of first and second frequencies, respectively.

The instructions to cause the processor to determine the frequency may further include instructions to cause the processor to determine the first frequency, and thereby the first bit value, if consecutive ones of the time-spaced determined intensity levels are the same, and the second frequency, and thereby the second bit value, if consecutive ones of the time-spaced determined intensity levels are different.

The group of sequential lines of sampled light energy may include past, present, and future lines of sampled light energy indicating respective past, present, and future sampled light intensity levels.

The instruction to cause the processor to determine may further include instructions to cause the processor to determine the intensity level of the light based on a comparison between the past, present, and future sampled light intensity levels.

An apparatus embodiment includes:

a light transmitter that includes:
  one or more lights to transmit multiple light packets each formatted to include a same message comprising a series of bits, each bit represented as light that is intensity modulated over a bit period at a frequency indicative of the bit; and
  a controller to vary transmit start-times of the multiple messages relative to each other and a receiver sample timeline that is asynchronous to the bit period and the frequency, to thereby establish different sample phases of the sample timeline, one for each of the same messages.

The apparatus may further include a light receiver to receive the multiple transmitted light packets, the light receiver including:
  a light imager to sample the multiple received light packets based on the asynchronous sample timeline, to produce samples for each received message that coincide in time with the one of the different sample phases established for that message;
  a detector to demodulate each of the sampled messages, to produce multiple demodulated messages; and
  a message constructor to construct a series of data bits representative of the same message based on the multiple demodulated messages.

The sample timeline may include consecutive sample times spaced apart so as to produce at least two samples per bit period.

The light imager may be configured to sample the received light packets for a sample integration time to produce each of the samples.

Adjacent ones of the different sample phases may be separated by at least twice the integration time.

In the apparatus, the one or more lights may include multiple, spatially separated lights each to transmit a respective one of the multiple light packets so that all of the light packets are spatially-separated and partially overlap in time; and the controller may be configured to vary start-times of the multiple light packets and, as a result, the start-times of their respective messages, so that the messages have successive start-times to establish the different sample phases as successive sample phases.

The apparatus may further include a light receiver to receive the multiple spatially-separated transmitted light packets, and the light receiver may include:
  a light imager to sample the multiple spatially-separated received light packets based on the asynchronous sample timeline, to produce samples for each received message that coincide in time with the one of the different sample phases established for that message;
  a detector to demodulate each of the sampled messages, to produce multiple demodulated messages; and
  a message constructor to construct a series of data bits representative of the same message based on the multiple demodulated messages.

Each of the multiple light packets may include sequential fields including a delimiter having a variable time duration followed by the same message;

The one or more lights may include a light to transmit the multiple light packets as successive contiguous light packets.

The controller is configured to vary the time durations of the successive delimiters with respect to each other and the sample timeline, to thereby establish the different sample phases.

The different sample phases may include a first sample phase followed by remaining successive sample phases, and phase differences between the first phase and each of the remaining successive phases increase monotonically.

The different sample phases may all be separated from each other by a time offset that is less than 1/frequency.

Each of the multiple light packets may be further formatted to include sequential light intensity modulated fields, including a delimiter followed by the same message. Each bit in the message being represented as light that is intensity modulated, for the bit period, at one of first and second frequencies indicative of one of first and second bit values, respectively. The delimiter may be represented as light that is intensity modulated, for a delimiter period, at a third frequency that is greater than each of the first and second frequencies.

The apparatus may further include a communication system to communicate with a network, a processor to interface between the communication system and a user interface system, and a housing to receive and/or hold the processor, the communication system, and the light transmitter.

The communication system may include a wireless communication system. The housing may include a mobile hand-held housing to house the communication system, the processor, the user interface system, and a battery.

An apparatus embodiment includes:
  a light detector array including spatially-successive lines of light detectors to sample light energy impinging thereon when exposed, the light energy conveying a bit value as light that is intensity modulated to multiple intensity levels at a frequency indicating a bit value;
  an exposure controller to sequentially expose the spatially-successive lines of light detectors to the light energy impinging thereon at a line exposure rate that is greater than the frequency, to produce a group of sequential lines of sampled light energy; and
  a detector to determine an intensity level of the light energy, among the multiple intensity levels, based on the group of sequential lines of sampled light energy.

The exposure controller may be configured to expose the spatially-successive lines of light detectors at the line exposure rate at multiple spaced-apart times per bit period, to produce multiple, time-spaced groups of sequential lines of sampled light energy per bit period.

The detector may be configured to determine an intensity level based on each of the multiple time-spaced groups of sequential lines of the light energy, to produce multiple time-spaced determined intensity levels per bit period.

The detector may be further configured to determine the frequency, and thereby the bit value, based on the multiple time-spaced determined intensity levels.

The line exposure rate may be asynchronous to both the frequency and a bit rate equal to an inverse of the bit period.

The light energy may convey one of first and second bit values as light that is intensity modulated to the multiple intensity levels at one of first and second frequencies, respectively; and The detector may be configured to determine the first frequency, and thereby the first bit value, if consecutive ones of the time-spaced determined intensity levels are the same.

The detector may be configured to determine the second frequency, and thereby the second bit value, if consecutive ones of the time-spaced determined intensity levels are different.

The group of sequential lines of sampled light energy may include past, present, and future lines of sampled light energy indicating respective past, present, and future sampled light intensity levels.

The detector may be configured to determine the intensity level of the light based on a comparison between the past, present, and future sampled light intensity levels.

The apparatus may further include a communication system to communicate with a network, a processor to interface between the communication system and a user interface system, and a housing to receive and/or hold the processor, the communication system, imaging array, the exposure controller, and/or the detector. The communication system may include a wireless communication system. The housing may include a mobile hand-held housing to house the communication system, the processor, the user interface system, and a battery.

A method embodiment includes:
transmitting multiple light packets each formatted to include a same message comprising a series of bits, each bit represented as light that is intensity modulated over a bit period at a frequency indicative of the bit; and
varying transmit start-times of the multiple messages relative to each other and a receiver sample timeline that is asynchronous to the bit period and the frequency, to thereby establish different sample phases of the sample timeline, one for each of the messages.

The method may further include:
receiving the multiple transmitted light packets;
sampling the received multiple light packets based on the asynchronous sample timeline, to produce samples for each received message that coincide in time with the one of the different sample phases established for that message;
demodulating each of the sampled messages, to produce multiple demodulated messages; and
constructing a series of data bits representative of the same message based on the multiple demodulated messages.

The sample timeline may include consecutive sample times spaced apart so as to produce at least two samples per bit period.

The sampling may include sampling the received light packets for a sample integration time to produce each of the samples; and Adjacent ones of the different sample phases may be separated by at least twice the integration time.

The transmitting may include transmitting the multiple light packets as multiple, spatially separated light packets so that all of the light packets partially overlap in time.

The varying may include varying the start-times of the multiple light packets and, as a result, the start-times of their respective messages, so that the messages have successive start-times to establish the different sample phases as successive sample phases.

Each of the multiple light packets may include sequential fields including a delimiter having a variable time duration followed by the same message;
the transmitting may include transmitting the multiple light packets as successive contiguous light packets.

The varying may include varying the time durations of the successive delimiters with respect to each other and the sample timeline, to thereby establish the different sample phases.

The different sample phases may include a first sample phase followed by remaining successive sample phases, and phase differences between the first phase and each of the remaining successive phases increase monotonically.

The different sample phases may all be separated from each other by a time offset that is less than 1/frequency.

Each of the multiple light packets may be further formatted to include sequential light intensity modulated fields, including a delimiter followed by the same message. Each bit in the message may be represented as light that is intensity modulated, for the bit period, at one of first and second frequencies indicative of one of first and second bit values, respectively. The delimiter may be represented as light that is intensity modulated, for a delimiter period, at a third frequency that is greater than each of the first and second frequencies.

Another method embodiment includes:
receiving light energy on spatially-successive lines of light detectors, the spatially-successive lines of light detectors to sample the light energy impinging thereon when exposed, the light energy conveying a bit value as light that is intensity modulated to multiple intensity levels at a frequency indicating a bit value;
sequentially exposing the spatially-successive lines of light detectors to the light energy impinging thereon at a line exposure rate that is greater than the frequency, to produce a group of sequential lines of sampled light energy; and
determining an intensity level of the light energy, among the multiple intensity levels, based on the group of sequential lines of sampled light energy.

The method may further include repeating the sequentially exposing at multiple spaced-apart times per bit period, to produce multiple, time-spaced groups of sequential lines of sampled light energy per bit period, and the determining may include determining:
an intensity level based on each of the multiple time-spaced groups of sequential lines of the light energy, to produce multiple time-spaced determined intensity levels per bit period, and
the frequency, and thereby the bit value, based on the multiple time-spaced determined intensity levels.

The line exposure rate may be asynchronous to both the frequency and a bit rate equal to an inverse of the bit period.

The light energy may convey one of first and second bit values as light that is intensity modulated to the multiple intensity levels at one of first and second frequencies, respectively; and The determining the frequency may further include determining the first frequency, and thereby the first bit value, if consecutive ones of the time-spaced determined intensity levels are the same.

The determining the frequency may further include determining the second frequency, and thereby the second bit value, if consecutive ones of the time-spaced determined intensity levels are different.

The group of sequential lines of sampled light energy may include past, present, and future lines of sampled light energy indicating respective past, present, and future sampled light intensity levels, and the determining may include determining the intensity level of the light based on a comparison between the past, present, and future sampled light intensity levels.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A method, comprising:
encoding an identical message in each of first and second light packets, including, for each light packet, cycling a light intensity at one of first and second frequencies for each bit of a message based on a value of a respective bit; and
transmitting the first and second light packets, including transmitting the second light packet with a phase difference relative to the first light packet, and further including,
transmitting the first and second light packets from respective first and second light sources, including delaying a transmission start time of the second light packet relative to a transmission start time of the first light packet to impart the phase difference or,
transmitting the first and second light packets serially, including setting a delimiter portion of the first light packet to a first duration and setting a delimiter portion of the second light packet to a second duration that differs from the first duration.

2. The method of claim 1, wherein the transmitting includes:
the transmitting the first and second light packets from the respective first and second light sources, including delaying a transmission start time of the second light packet relative to a transmission start time of the first light packet to impart the phase difference.

3. The method of claim 1, wherein the transmitting includes:
the transmitting the first and second light packets serially, including setting a delimiter portion of the first light packet to a first duration and setting a delimiter portion of the second light packet to a second duration that differs from the first duration.

4. The method of claim 3, wherein:
the setting a delimiter portion of the first light packet includes cycling the light intensity at a third frequency for the first duration of the delimiter portion of the first light packet; and
the setting a delimiter portion of the second light packet includes cycling the light intensity at the third frequency for the second duration of the delimiter portion of the second light packet.

5. The method of claim 1, wherein the encoding includes encoding the identical message in one or more additional light packets, and wherein the transmitting includes:

serially transmitting the first light packet, the second light packet, and the one or more additional light packets; and
providing each of the second light packet and the one or more additional light packets with a phase difference relative to a preceding one of the light packets.

6. The method of claim 5, wherein the providing includes:
monotonically increasing the phase difference for each successive one of the light packets.

7. An apparatus, comprising, a light transmitter configured to:
encode an identical message in each of first and second light packets, including, for each light packet, to cycle a light intensity at one of first and second frequencies for each bit of a message based on a value of a respective bit; and
transmit the first and second light packets, including to transmit the second light packet with a phase difference relative to the first light packet, and further including to transmit the first and second light packets from respective first and second light sources, including to delay a transmission start time of the second light packet relative to a transmission start time of the first light packet to impart the phase difference, or
transmit the first and second light packets serially, including to set a delimiter portion of the first light packet to a first duration and set a delimiter portion of the second light packet to a second duration that differs from the first duration.

8. The apparatus of claim 7, wherein the transmitter is further configured to:
transmit the first and second light packets from the respective first and second light sources, including to delay the transmission start time of the second light packet relative to the transmission start time of the first light packet to impart the phase difference.

9. The apparatus of claim 7, wherein the transmitter is further configured to:
transmit the first and second light packets serially, including to set the delimiter portion of the first light packet to a first duration and to set the delimiter portion of the second light packet to a second duration that differs from the first duration.

10. The apparatus of claim 9, wherein the transmitter is further configured to:
cycle the light intensity at a third frequency for the first duration of the delimiter portion of the first light packet; and
cycle the light intensity at the third frequency for the second duration of the delimiter portion of the second light packet.

11. The apparatus of claim 7, wherein the transmitter is further configured to:
encode the identical message in one or more additional light packets;
serially transmit the first light packet, the second light packet, and the one or more additional light packets; and
provide each of the second light packet and the one or more additional light packets with a phase difference relative to a preceding one of the light packets.

12. The apparatus of claim 11, wherein the transmitter is further configured to:
monotonically increase the phase difference for each successive one of the light packets.

13. A non-transitory computer readable medium encoded with a computer program that includes instructions to cause a processor to:
   encode an identical message in each of first and second light packets, including, for each light packet, to cycle a light intensity at one of first and second frequencies for each bit of a message based on a value of a respective bit; and
   transmit the first and second light packets, including to transmit the second light packet with a phase difference relative to the first light packet, and further including to
      transmit the first and second light packets from respective first and second light sources, including to delay a transmission start time of the second light packet relative to a transmission start time of the first light packet to impart the phase difference, or
      transmit the first and second light packets serially, including to set a delimiter portion of the first light packet to a first duration and set a delimiter portion of the second light packet to a second duration that differs from the first duration.

14. The non-transitory computer readable medium of claim 13, further including instructions to cause the processor to:
   transmit the first and second light packets from the respective first and second light sources, including to delay the transmission start time of the second light packet relative to the transmission start time of the first light packet to impart the phase difference.

15. The non-transitory computer readable medium of claim 13, further including instructions to cause the processor to:
   transmit the first and second light packets serially, including to set the delimiter portion of the first light packet to a first duration and to set the delimiter portion of the second light packet to a second duration that differs from the first duration.

16. The non-transitory computer readable medium of claim 15, further including instructions to cause the processor to:
   cycle the light intensity at a third frequency for the first duration of the delimiter portion of the first light packet; and
   cycle the light intensity at the third frequency for the second duration of the delimiter portion of the second light packet.

17. The non-transitory computer readable medium of claim 13, further including instructions to cause the processor to:
   encode the identical message in one or more additional light packets;
   serially transmit the first light packet, the second light packet, and the one or more additional light packets; and
   provide each of the second light packet and the one or more additional light packets with a phase difference relative to a preceding one of the light packets.

18. The non-transitory computer readable medium of claim 17, further including instructions to cause the processor to:
   monotonically increase the phase difference for each successive one of the light packets.

* * * * *